(12) United States Patent
Kim

(10) Patent No.: US 12,034,878 B2
(45) Date of Patent: Jul. 9, 2024

(54) MOBILE TERMINAL

(71) Applicant: LG ELECTRONICS INC., Seoul (KR)

(72) Inventor: Dongsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 17/441,901

(22) PCT Filed: Mar. 27, 2019

(86) PCT No.: PCT/KR2019/003531
§ 371 (c)(1),
(2) Date: Sep. 22, 2021

(87) PCT Pub. No.: WO2020/196947
PCT Pub. Date: Oct. 1, 2020

(65) Prior Publication Data
US 2022/0201108 A1    Jun. 23, 2022

(51) Int. Cl.
*H04M 1/02*     (2006.01)
*G06F 1/16*     (2006.01)
(Continued)

(52) U.S. Cl.
CPC ........ *H04M 1/0268* (2013.01); *G06F 1/1652* (2013.01); *G06F 1/1681* (2013.01);
(Continued)

(58) Field of Classification Search
CPC ........... H04M 1/0268; H04M 2201/38; H04M 1/022; H04M 2201/08; H04M 1/0233;
(Continued)

(56) References Cited

U.S. PATENT DOCUMENTS 6,473,076 B1 * 10/2002 Thompson ................ G06F 1/26
345/173
7,242,445 B2    7/2007 Akiyama et al.
(Continued)

FOREIGN PATENT DOCUMENTS

CN         1973240 B   * 12/2010 ............. G02F 1/167
CN      109032370 A    * 12/2018 ........... G06F 3/0202
(Continued)

*Primary Examiner* — Keith Ferguson
(74) *Attorney, Agent, or Firm* — Birch, Stewart, Kolasch & Birch, LLP

(57) ABSTRACT

The present invention relates to a mobile terminal structure comprising: a body; a display deformed along the outer surface of the body by means of an external force; and a frame part which supports the display and which is modified into a shape of encompassing the outer surface of the body, wherein the frame part comprises: a rear plate which is coupled to one surface of the display and which can be modified together with the display so as to correspond to the outer surface of the body; and link parts which are respectively provided to both sides of the rear plate and which include a plurality of link members arranged in parallel to each other, and the display can be wound or unwound together with the rear plate along the outer surface of the body by means of the rotation between the connected link members of the link parts.

20 Claims, 21 Drawing Sheets

(51) Int. Cl.
*G06F 3/0354* (2013.01)
*G06F 3/038* (2013.01)

(52) U.S. Cl.
CPC ........ *G06F 3/03545* (2013.01); *G06F 3/0383* (2013.01); *H04M 1/022* (2013.01); *G06F 2200/1632* (2013.01); *H04M 2201/08* (2013.01); *H04M 2201/38* (2013.01)

(58) Field of Classification Search
CPC .. G06F 1/1681; G06F 3/03545; G06F 3/0383; G06F 2200/1632
See application file for complete search history.

(56) References Cited

U.S. PATENT DOCUMENTS

| | | | |
|---|---|---|---|
| 2016/0324021 A1* | 11/2016 | Takayanagi | G06F 1/1652 |
| 2016/0363960 A1* | 12/2016 | Park | G09F 15/0062 |
| 2017/0196102 A1* | 7/2017 | Shin | G06F 1/1652 |
| 2018/0059727 A1* | 3/2018 | Seo | G06F 1/1656 |

FOREIGN PATENT DOCUMENTS

| | | |
|---|---|---|
| KR | 10-0818170 B1 | 4/2008 |
| KR | 10-2016-0100774 A | 8/2016 |
| KR | 10-2017-0006089 A | 1/2017 |
| KR | 10-2017-0143081 A | 12/2017 |
| KR | 10-2018-0025358 A | 3/2018 |

\* cited by examiner

MOBILE TERMINAL

CROSS-REFERENCE TO RELATED APPLICATIONS

This application is the National Stage filing under 35 U.S.C. 371 of International Application No. PCT/KR2019/003531, filed on Mar. 27, 2019, the contents of which are all hereby incorporated by reference herein in their entirety.

TECHNICAL FIELD

The present disclosure relates to a mobile terminal having a flexible display.

BACKGROUND

Terminals may be classified into mobile/portable terminals and stationary terminals according to their mobility. Furthermore, mobile terminals may be divided into hand-held terminals and vehicle mounted terminals according to whether or not it can be directly carried by a user.

The functions of mobile terminals have been diversified. For example, the functions may include data and voice communication, photographing and video shooting through a camera, voice recording, playing a music file through a speaker system, and displaying an image or video on a display. Some terminals further include an electronic game play function or perform a multimedia player function. In particular, in recent years, mobile terminals may receive multicast signals that provide visual content such as broadcast, video or television programs.

As it becomes multifunctional in recent years, such a terminal is allowed to capture still images or moving images, play music or video files, play games, receive broadcast and the like, so as to be implemented as an integrated multimedia player. Furthermore, in order to support and enhance the functions of the terminal, the improvement of structural or software elements of the terminal may be taken into consideration.

In addition, mobile terminals are evolving into various types of designs, and efforts are being made to develop new types of mobile terminals to meet the needs of users who want newer and more diverse designs. New designs may also include structural changes and improvements for the user to more conveniently use the mobile terminal. For the structural changes and improvements, a mobile terminal in which at least part of a display can be bent or warped have attracted attention.

However, in the case of a mobile terminal using a flexible display, a structure for implementing this is required, and there has been a problem that the internal structure of the mobile terminal must be complicated in order for a display to be smoothly unrolled or rolled.

SUMMARY

An aspect of the present disclosure is to provide a structure of a mobile terminal with improved convenience and portability by rolling or unrolling a display having a foldable feature on a body.

Another aspect of the present disclosure is to implement an extended function by coupling a sub mobile terminal to the display while the mobile terminal and the display are separated from each other.

Still another aspect of the present disclosure is to provide a structure of a mobile terminal in which the display can be effectively rolled or unrolled on the body.

Yet still another aspect of the present disclosure is to provide a structure of a mobile terminal capable of reducing an external force applied to the display even due to a shape deformation of the display when the display is rolled along the body.

In order to solve the foregoing problems, a mobile terminal according to the present disclosure may include a body; a display configured to be deformed along an outer surface of the body by an external force; and a frame part that supports the display and that is deformed to a shape surrounding the outer surface of the body, wherein the frame part includes a rear plate coupled to one surface of the display to be deformable so as to correspond to the outer surface of the body together with the display; and link parts provided on both sides of the rear plate, respectively, and provided with a plurality of link members arranged one another side by side, and the link parts allow the display to be rolled or unrolled along the outer surface of the body together with the rear plate by rotation between the link members connected to one another. Through this, the convenience of use and the convenience of storage can be secured.

According to an example of the present disclosure, the link parts may define a rolled state of the display while being respectively in close contact with the outer surface of the body, and define an unrolled state of the display while being spaced apart from the outer surface of the body.

According to another example of the present disclosure, the link members may be configured to be mutually rotatable between members adjacent to one another so as to define a rolled state of the display as a separation distance between the link members adjacent to one another decreases, and define an unrolled state of the display as the separation distance between the link members adjacent to one another increases.

According to an example of the present disclosure, the display and the link part may be respectively provided on the same surface of the rear plate, and the display may be rolled around the body to allow a front surface portion thereof to face the outside.

According to an example of the present disclosure, the mobile terminal may further include a first link part and a second link part spaced apart from the display by a predetermined distance along a direction in which the display is unrolled and disposed to face each other at upper and lower portions of the display, wherein the first link part and the second link part are rolled together in the same direction along the outer surface of the body along the rear plate.

According to an example of the present disclosure, the display and the link part may be respectively provided on different surfaces of the rear plate, and the rear plate may be exposed to the outside when the display is rolled around the body.

According to an example of the present disclosure, a board mounting part may be coupled to an end portion of the rear plate, and a flexible printed circuit board (FPCB) on which electronic devices are mounted may be provided in the board mounting part.

According to an example of the present disclosure, a battery may be provided in the board mounting part or the printed circuit board to supply power to the display together with a battery provided in the body.

According to an example of the present disclosure, a sub mobile terminal may be coupled to the board mounting part to allow independent driving of the display, and the display may be used in various ways.

According to an example of the present disclosure, the frame part may further include a support bar provided at an end portion of the rear plate to connect the link parts disposed to face each other, and the support bar may be coupled to one side of the outer surface of the body.

According to an example of the present disclosure, a support bar seating groove may be formed on the outer surface of the body to have a predetermined shape in a length direction, and be recessed in a shape corresponding to an outer surface of the support bar to allow the support bar to be seated therein.

According to an example of the present disclosure, at least one first magnet may be provided at one side of the support bar seating groove, at least one second magnet may be provided at a position corresponding to the first magnet, and the first magnet and the second magnet may form an attractive force by interaction to allow the support bar to be seated in the support bar seating groove.

According to an example of the present disclosure, the first magnet may be provided on one side of the outer surface of the body, a third magnet may be provided on one side of the rear plate spaced farthest apart from the body when the frame part is in an unrolled state, and the third magnet may provide an external force to allow the body to be in close contact with each other when the frame part is wound around the body.

According to an example of the present disclosure, the link member may include a first link member positioned at one end portion thereof, and fixed to both ends of the support bar through a connection pin; a second link member connected to the first link member, the second link member provided in plurality of the same shape to be arranged side by side; and a third link member positioned at another end portion thereof and connected to the second link member.

According to an example of the present disclosure, a connection protrusion may protrude from a front end portion of the second link member, and a guide protrusion may protrude from a rear end portion of the second link member, a connection groove disposed may be recessed into the guide protrusion, and the connection protrusion may be inserted into the connection groove of the adjacent second link member to be coupled through the connection pin, so as to rotate with respect to each other.

According to an example of the present disclosure, a first fastening hole having an oval shape may be disposed in the connection protrusion, a second fastening hole having a circular shape may be formed in the guide protrusion, and the connection pin may be inserted to pass through the first fastening hole of one of the plurality of second link members and the second fastening hole of another one of the plurality of second link members, which are disposed adjacent to each other.

According to an example of the present disclosure, a rotation limiter may protrude from the second link member to limit rotation beyond a set rotation angle.

According to an example of the present disclosure, the rear plate may be rolled along an outer surface of the body while the link member supports the rear plate.

According to an example of the present disclosure, a mounting groove defined by a fixed space along an extension direction of the body may be formed at a central portion of the body.

According to an example of the present disclosure, a battery may be provided in the mounting groove to supply power to the mobile terminal.

According to an example of the present disclosure, a mounting member for supporting the mobile terminal may be mounted to the mounting groove and configured to be pulled out by a user.

According to an example of the present disclosure, a stylus may be inserted into or drawn out from the mounting groove.

According to an example of the present disclosure, the stylus may be configured to allow at least a portion thereof to be drawn out from the mounting groove due to an elastic force by an elastic member.

The effects of the present disclosure obtained through the foregoing solutions are as follows.

According to a mobile terminal having the above-described structure, a display having a foldable feature may have a structure that can be rolled or unrolled along an outside of a body by a link part, thereby further increasing portability and convenience of use.

Furthermore, a display may be unrolled from the mobile terminal, and then separated from the body, and a sub mobile terminal may be additionally coupled to a board mounting portion, thereby implementing an extended function through the sub mobile terminal.

In addition, the display may be rolled along an outer surface of the body through the link part, thereby efficiently maintaining the rolled state through a magnet.

Moreover, when the display is rolled or unrolled along the outer surface of the body, only rolling in one direction may be allowed through a structure of link parts connected one another side by side, thereby limiting an external force applied to the display.

DETAILED DESCRIPTION

Figure 1:
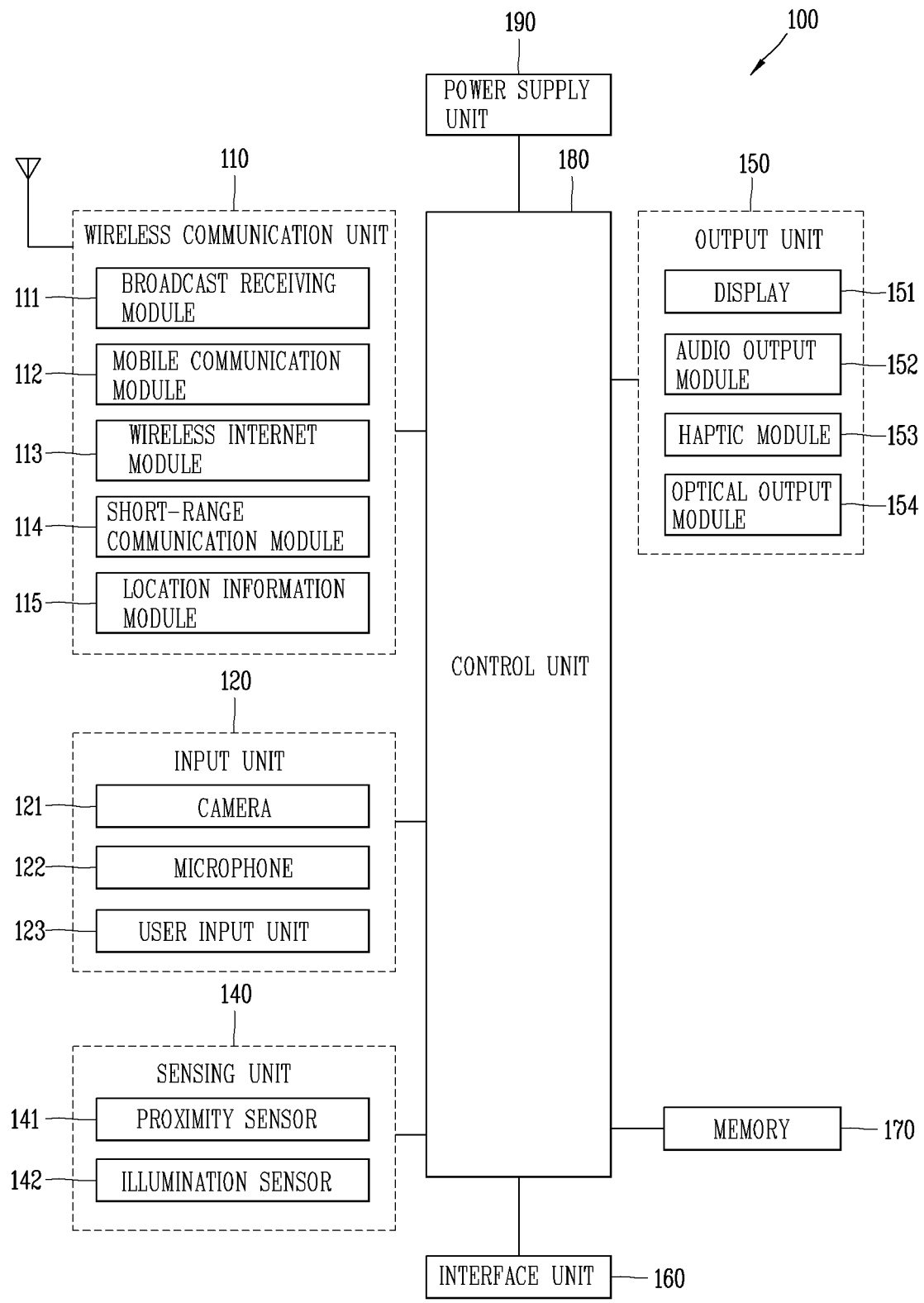
FIG. 1 is a block diagram for explaining a mobile terminal associated with the present disclosure.

Hereinafter, implementations disclosed herein will be described in detail with reference to the accompanying drawings, and the same or similar elements are designated with the same numeral references regardless of the numerals in the drawings and their redundant description will be omitted.

A suffix "module" and "unit" used for constituent elements disclosed in the following description is merely intended for easy description of the specification, and the suffix itself does not give any special meaning or function.

In describing the present disclosure, moreover, the detailed description will be omitted when a specific description for publicly known technologies to which the disclosure pertains is judged to obscure the gist of the present disclosure.

The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (e.g., smart watches, smart glasses, head mounted displays (HMDs)), and the like.

However, it may be easily understood by those skilled in the art that the configuration according to the exemplary implementations of this specification can also be applied to stationary terminals such as digital TV, desktop computers, digital signages, and the like, excluding a case of being applicable only to the mobile terminals.

FIG. 1 is a block diagram for explaining a mobile terminal associated with the present disclosure.

The mobile terminal 100 may include components, such as a wireless communication unit 110, an input unit 120, a sensing unit 140, an output unit 150, an interface unit 160, a memory 170, a controller 180, a power supply unit 190 and the like. The components shown in FIG. 1 are not essential for implementing a mobile terminal, and thus the mobile terminal described herein may have more or fewer components than those listed above.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules that connect the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (e.g., a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (e.g., refer to the camera 121), a microphone 122, a battery gage, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display 151, an audio output module 152, a haptic module 153, an optical output unit 154 and the like.

The display 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (e.g., receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary implementations described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1, prior to explaining various exemplary implementations achieved by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to link data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Then, the input unit 120 is configured to provide a video information (or signal), audio information (or signal), data or an input of information entered by a user, and the mobile terminal 100 may include one or a plurality of cameras 121 to enter video information. The camera 121 processes an image frame, such as still picture or video, acquired by an image sensor in a video phone call or image capturing mode. The processed image frames may be displayed on the display 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (e.g., a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. The touch sensor may be configured to detect a position, an area where a touch object applying a touch onto the touch screen is touched on the touch sensor, a pressure at the time of touch, a capacitance at the time of touch, and the like. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. Meanwhile, the controller 180 may calculate the location of a wave generating source through information sensed from the optical sensor and the plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

The camera 121 and the laser sensor may be combined with each other to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display 151 displays (outputs) information processed by the mobile terminal 100. For example, the display 151 may display execution screen information of an application program driven in the mobile terminal 100 or user interface (UI) and graphic user interface (GUI) information in response to the execution screen information. Furthermore, the display 151 may also be implemented as a stereoscopic display for displaying stereoscopic images.

The stereoscopic display may employ a stereoscopic display scheme such as stereoscopic scheme (a glass scheme), an auto-stereoscopic scheme (glassless scheme), a projection scheme (holographic scheme), or the like.

The audio output unit 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output unit 154 may output a signal for indicating an event generation using the light of a light source of the mobile terminal 100. Examples of events generated in the mobile terminal 100 may include a message reception, a call signal reception, a missed call, an alarm, a schedule notice, an email reception, an information reception through an application, and the like.

A signal output by the optical output unit 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. A device having the identification module (hereinafter, an "identification device") may be fabricated in the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (e.g., phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may execute or release a locked state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary implementations disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various implementations described herein may be implemented in a computer-readable or its similar medium using, for example, software, hardware, or any combination thereof.

Figure 2A:
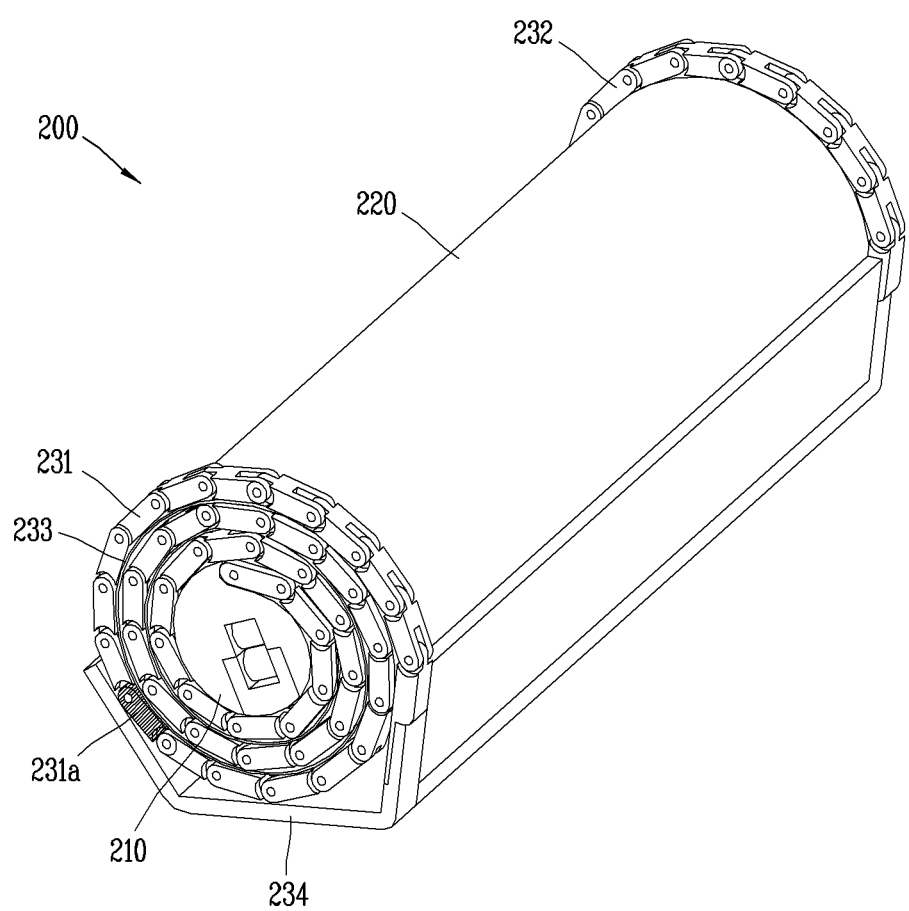
FIG. 2A is a perspective view showing the mobile terminal according to the present disclosure.
Figure 2B:
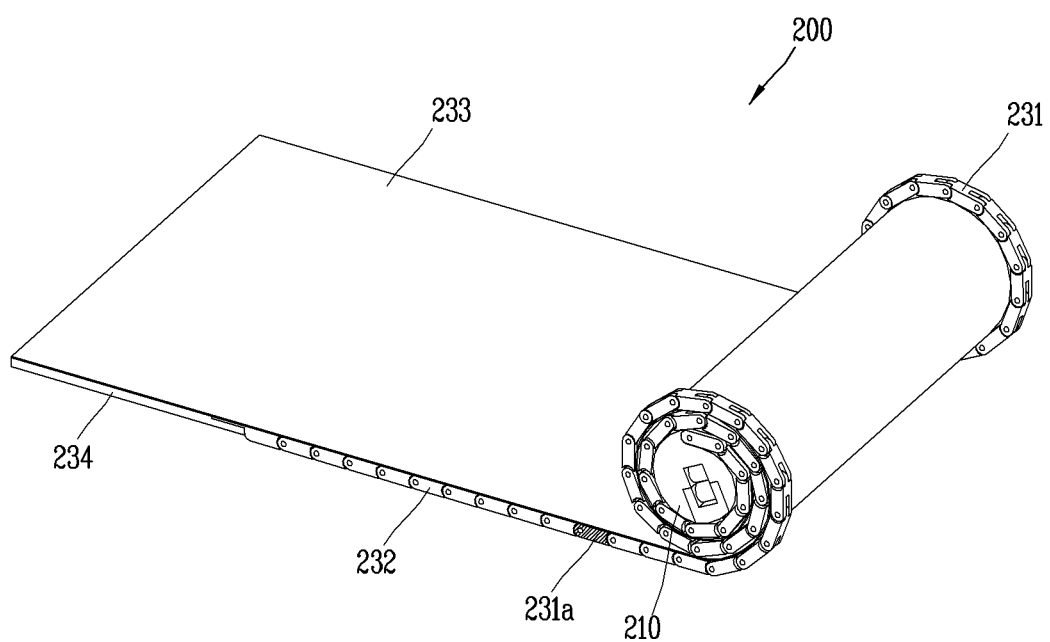
FIG. 2B is a perspective view showing a shape in which a display of the mobile terminal in FIG. 2A is rolled.

FIG. 2A is a perspective view showing a mobile terminal 200 according to the present disclosure, and FIG. 2B is a perspective view showing a shape in which a display 220 of the mobile terminal 200 in FIG. 2A is rolled.

The display 220 may be rolled from one side of the body 210 in a clockwise or counterclockwise direction along an outer surface of a body 210. The display 220 rolled around the body 210 may have a shape in which a roll of tissue paper is rolled around a tissue core.

As a result, as shown in FIG. 2A, the display 220 is made to be rolled around the body 210 together with a frame part 230, and the display 220 can be rolled around the body 210 in an almost circular shape having several layers.

Here, for the sake of convenience, in this specification, a shape in which the display 220 is rolled in a clockwise direction together with link parts 231, 232 on one side of the body 210 will be described as an example.

According to the present disclosure, the mobile terminal 200 may include the frame part 230 configured to support the display 220, and to be rolled around the body 210.

The body 210 may be defined in a columnar shape extending in one direction. The body 210 may be defined such that the cut surface has a circular or polygonal shape.

The body 210 may be made of a metal material, and the frame part 230 may be formed by injection-molding synthetic resin or may be formed of, for example, stainless steel (STS), aluminum (Al), titanium (Ti), or the like.

In addition, a space in which various electronic components, a battery for supplying power, a mounting member 312 for supporting the display 220, and a stylus 412 for entering information into the display 220 may be provided inside the body 210. A detailed description thereof will be provided later.

The display 220 displays information processed by the mobile terminal 200. The display 220 may display execution screen information of an application program driven in the mobile terminal 200 or user interface (UI) and graphic user interface (GUI) information in response to the execution screen information.

The display 220 may include at least one of a liquid crystal display (LCD), a thin film transistor-liquid crystal display (TFT-LCD), an organic light emitting diode (OLED), a flexible display, a 3-dimensional (3D) display, and an e-ink display.

Furthermore, the display 220 may include a touch sensor (not shown) that senses a touch onto the display 220 so as to receive a control command in a touching manner. For example, when a user's touch signal is input to the display 220, the touch sensor may sense the touch, and the controller may generate a control command corresponding to the touch input based thereon. Here, content received in the touching manner may be a text or numerical value, or a menu item that can be indicated or designated in various modes.

As shown in FIGS. 2A and 2B, the mobile terminal 200 according to the present disclosure may display information processed using the display 220 having a flexible characteristic.

The display 220 may have a deformable characteristic by an external force. Here, deformation may denote at least one of bending, warping, folding, twisting, and curling of the display 220, and in the present disclosure, the display 220 may be configured to have a characteristic of being rolled around the body 210. In this specification, the rolling characteristic of the display 220 will be expressed using the term "rolling".

The display 220 may include a general flexible display, an e-paper, or a combination thereof.

The flexible display may denote a light, non-fragile display, which still exhibits characteristics of the conventional flat panel display and is fabricated on a flexible substrate which can be curved, bent, folded, twisted or rolled. Furthermore, the e-paper is a display technology employing the characteristic of a general ink, and is different from the conventional flat panel display in view of using reflected light. The e-paper may change information by using a twist ball or an electrophoresis using a capsule.

In a state in which the display 220 is not deformed (e.g., a state having an infinite radius of curvature, i.e., an unrolled state), a display area of the display 220 may define a flat surface. In a state in which the display 220 is deformed by an external force in an unrolled state (e.g., a state having a finite radius of curvature, that is, a rolled state), the display area of the display may be configured with a curved surface.

As shown in FIGS. 2A and 2B, when an external force is applied to the display 220 in the unrolled state of the display 220, the display 220 may be rolled around the body 210 together with the frame part 230, and finally will be in a state as shown in FIG. 2A.

The user may use the display 220 in an unrolled state, and the display 220 may be received in a state rolled around the body 210. Accordingly, the present disclosure has the advantage of being easily accommodated for storage along with portability of the mobile terminal 200.

Figure 3A:
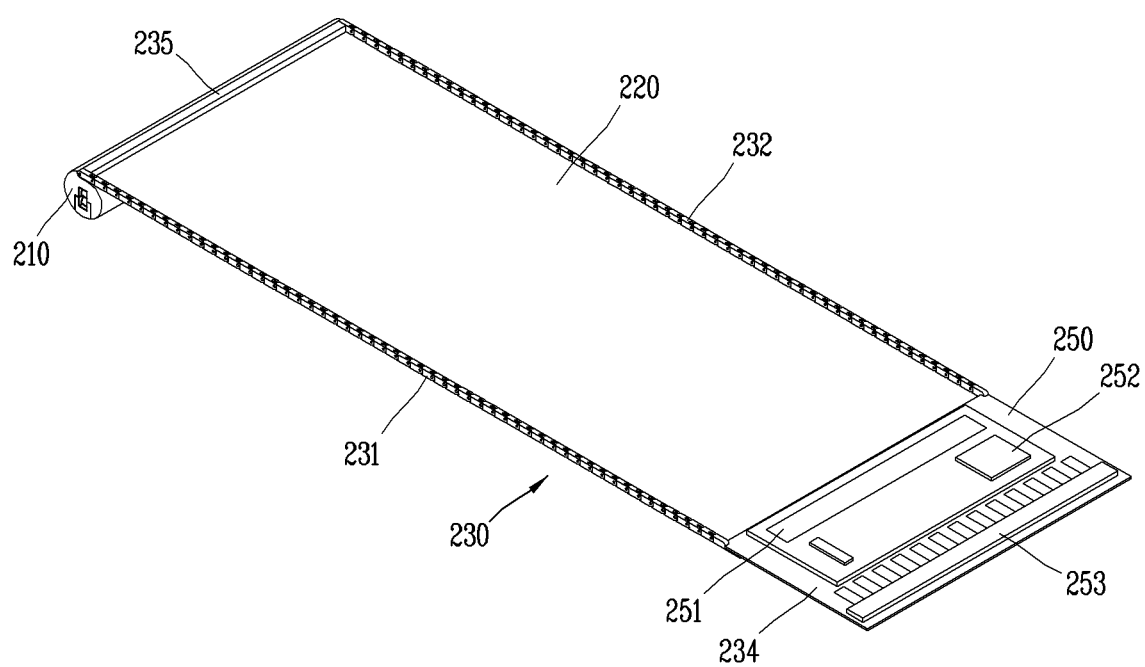
FIG. 3A is a perspective view showing a shape in which the display is unrolled from a body.
Figure 3B:
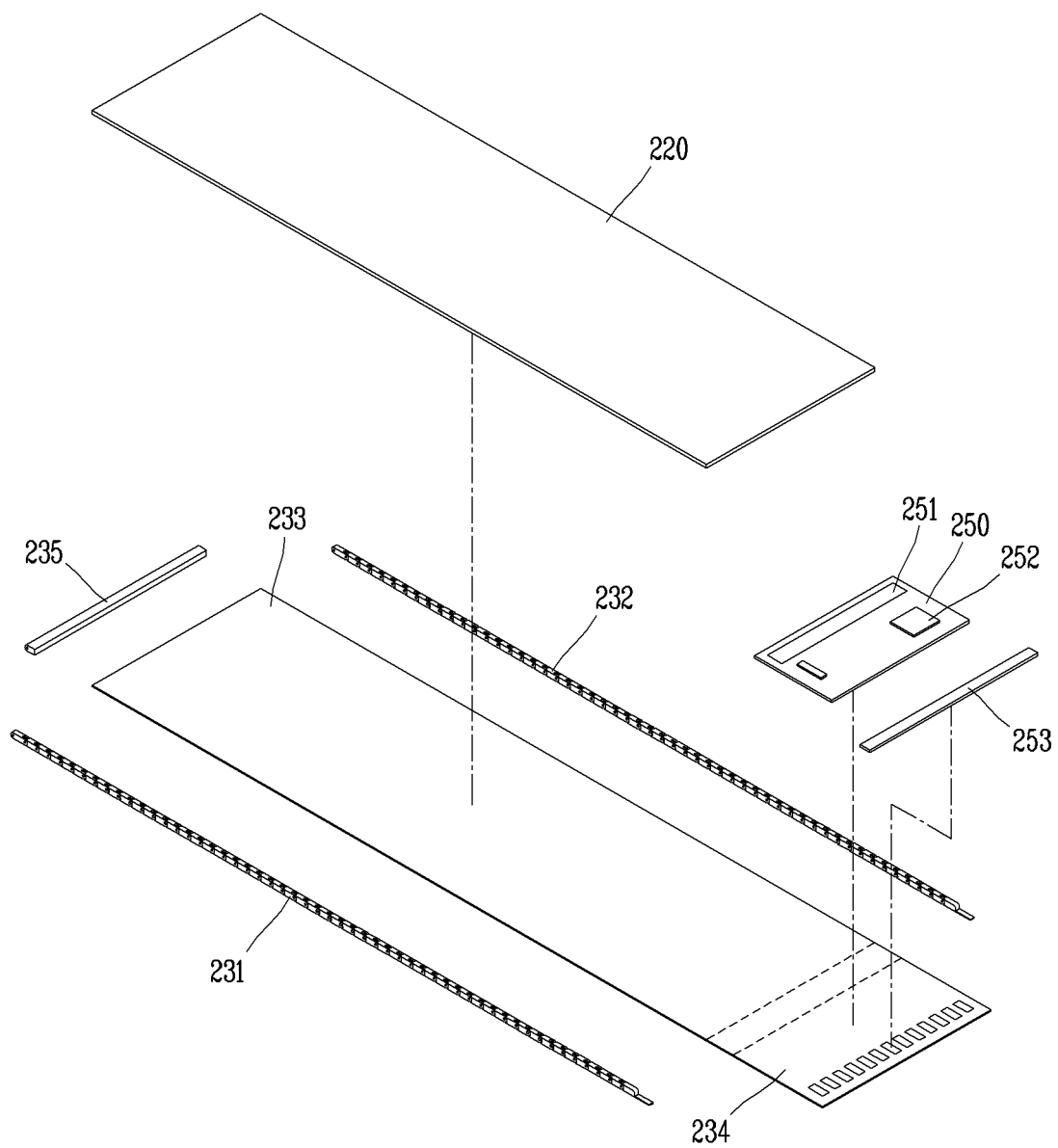
FIG. 3B is an exploded view of a frame part.

FIG. 3A is a perspective view showing a shape in which the display 220 is unrolled from the body 210, and FIG. 3B is an exploded view of the frame part 230.

The mobile terminal 200 according to the present disclosure may have a structure in which the display 220 is rolled along the body 210 together with the frame part 230 or unrolled from the body 210 to obtain convenience of portability and use.

Furthermore, in the present disclosure, the display 220 coupled to the frame part 230 may be unrolled from the body 210, and then completely separated from the body 210, and a separate sub mobile terminal 10 may be coupled thereto after being separated to display information by the sub mobile terminal 10 on the display 220. Through the use of the sub mobile terminal 10, multitasking is facilitated.

As described above in FIGS. 2A and 2B, the frame part 230 serves to guide the display 220 to be rolled around the body 210. The frame part 230 may be deformed into a shape surrounding an outer surface of the body 210 while supporting the display 220.

The frame part 230 may include a rear plate 233 and link parts 231, 232.

The rear plate 233 may be coupled to one surface of the display 220, and may be deformed to surround the outer surface of the body 210 together with the display 220.

The rear plate 233 may be formed of a thin super-elastic titanium alloy. The super-elastic titanium alloy may be made of a material having a yield strain of approximately 2.0 to 2.5% (based on a thickness of 0.3 mm). In addition, the rear plate 233 may be made of not only a super-elastic titanium alloy, but also a titanium-nickel-based (Ti—Ni) alloy, a titanium-aluminum-based (Ti—Al) alloy, and a thin-film stainless steel (STS).

The link parts 231, 232 serve to guide the movement of the display 220. When the frame part 230 is rolled around the body 210, the display 220 may be rolled around the body 210 while the link parts 231, 232 are deformed to surround the outer surface of the body 210.

As shown in FIG. 3A, the link parts 231, 232 may be provided on an upper surface of the rear plate 233, and the link parts 231, 232 may be respectively disposed on both upper and lower sides of the display 220 to be deformed along a direction in which the display 220 is rolled or unrolled.

The link parts 231, 232 may include a first link part 231 and a second link part 232 disposed to face each other on both sides of the display 220. The first link part 231 and the second link part 232 may have the same shape and may be disposed to face each other. The first link part 231 and the second link part 232 may serve to guide the rear plate 233 to be deformed along the outer surface of the body.

The first link part 231 and the second link part 232 may include a plurality of link members (or connecting bodies 231) arranged one another side by side. The first link part 231 and the second link part 232 allow the display 220 to be rolled or unrolled along the outer surface of the body 210 together with the rear plate 233 by rotation between the link members 241, 242, 243 connected to one another while being arranged adjacent to one another.

Specifically, the frame part 230 may further include a support bar 235 provided at one end portion of the rear plate 233 and extended to connect the first link part 231 and the second link part 232 disposed to face each other. Magnets 213, 235a may be respectively provided in the support bar 235 and the body 210 at positions corresponding to each other, thereby allowing the support bar 235 to be detachably attached to one side of the outer surface of the body 210.

The display 220 may be rolled in the form of a scroll while the support bar 235 is in close contact with the body 210 along the respective link parts 231, 232 in a state in which the support bar 235 is attached to the body 210, and the display 220 may be configured to be unrolled from the body 210 in a rolled state. When the display 220 is completely unrolled from the body 210, the support bar 235 attached to one side of the body 210 may be released by a magnetic force of the body 210, and the body 210 and the display 220 may be completely separated from each other.

As shown in FIG. 3B, a board mounting part 234 may be disposed at one end portion of the rear plate 233.

A flexible printed circuit board (FPCB) 250 mounted with electronic devices may be provided in the board mounting part 234, and for example, the flexible printed circuit board may be mounted with a driver IC and a communication module capable of transmitting and receiving communication signals.

For the driving of the display 220, the flexible printed circuit board 250 may be provided with a driver IC 251 for providing driving signals and data to a display panel as electrical signals (multi high voltage level signals) to display characters or video images on the screen. In other words, according to the present disclosure, the display 220 may be detachably attached to the body 210, and the driver IC may be mounted on the printed circuit board 250 provided in the board mounting part 234 of the display 220 other than the body 210, and there is an advantage in that the display 220 can be utilized even in a state of being separated from the body 210.

Electronic devices may be provided on the printed circuit board 250 to transmit and receive communication signals. In addition, a battery for supplying power may be provided on one side of the printed circuit board 250 or one side of the board mounting part 234 to supply power to the display 220.

The board mounting part 234 may be divided into rigid regions and flexible regions. The board mounting part 234 may have a structure in which the rigid regions and the flexible regions are alternately disposed.

A flexible region may be disposed between the rigid regions of the board mounting part 234, and an area of the rigid region may be larger than that of the flexible region.

Electronic components for operating the display 220 may be provided in the rigid region, thereby preventing the electronic components from being damaged due to being pressed by an external force.

At this time, when the display 220 is rolled around the body 210, the flexible region may be deformed with a curvature corresponding thereto, thereby allowing the board mounting part 234 to be easily rolled along the body 210.

Additionally, a hinge (not shown) may be provided between the rigid region and the flexible region, thereby allowing the rigid region to be rolled along the body 210 when the display 220 is rolled around the body 210.

Figure 4:
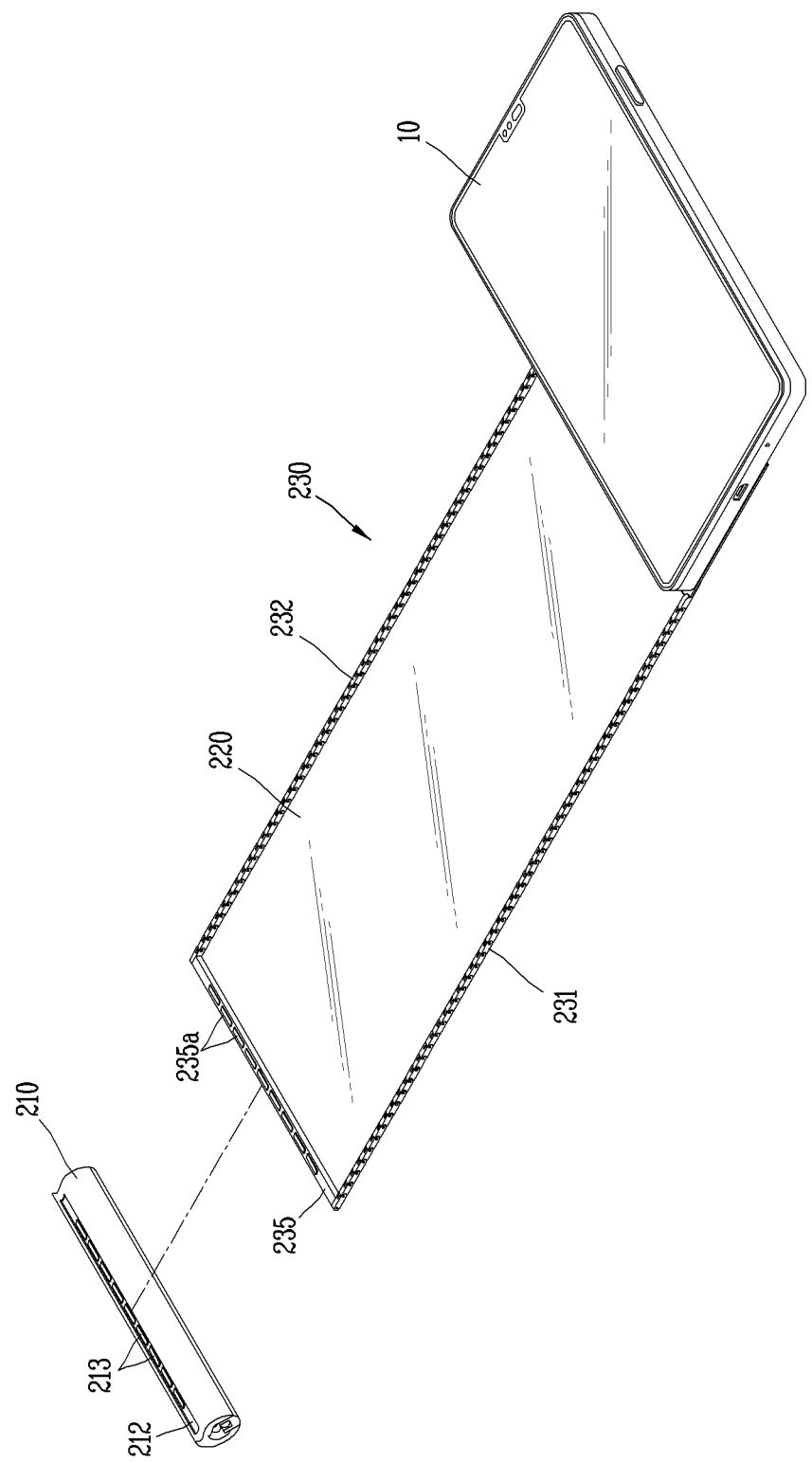
FIG. 4 is a perspective view showing a state in which the body and the frame part are separated from each other.
Figure 5:
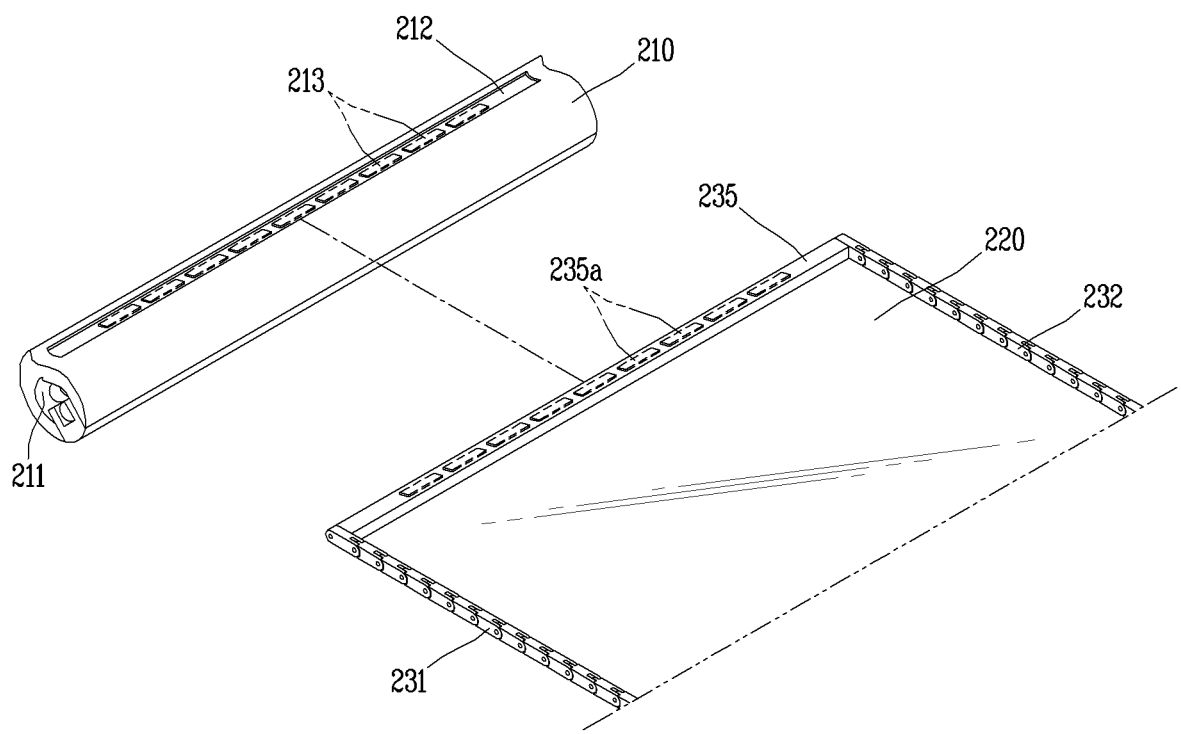
FIG. 5 is an enlarged view showing a coupling shape between the body and the frame part.
Figure 6A:
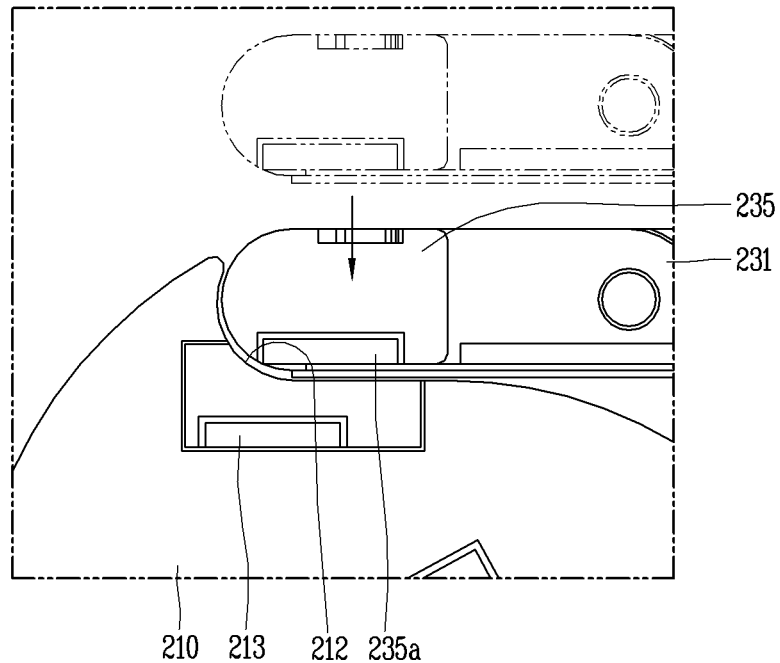
FIG. 6A is a conceptual view showing a shape in which a body and a frame part are attached to each other.
Figure 6B:
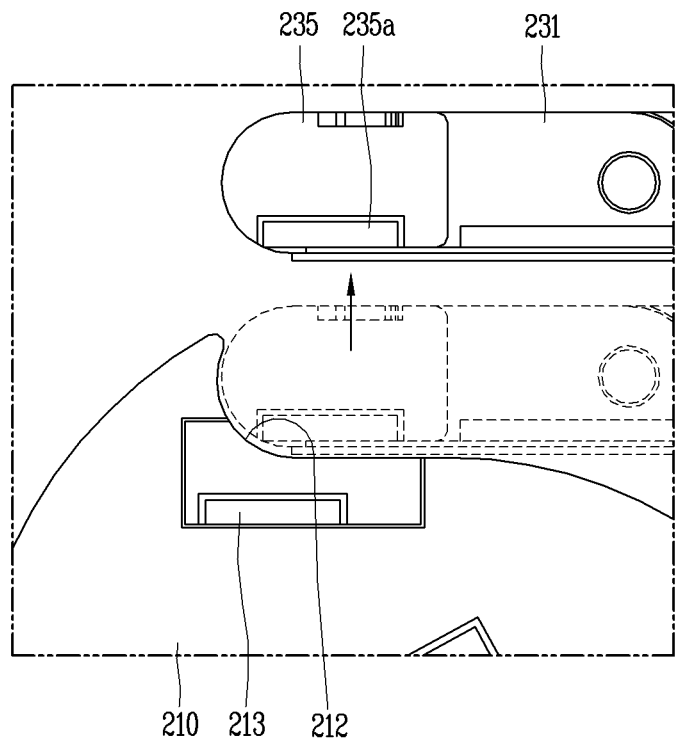
FIG. 6B is a conceptual view showing a shape in which the body and the frame part are attached to each other.

FIG. 4 is a perspective view showing a state in which the body 210 and the frame part 230 are separated from each other, and FIG. 5 is an enlarged view showing a coupling shape between the body 210 and the frame part 230. Furthermore, FIG. 6A is a conceptual view showing a shape in which the body 210 and the frame part 230 are attached to each other, and FIG. 6B is a conceptual view showing a shape in which the body 210 and the frame part 230 are attached to each other.

In the mobile terminal 200 according to the present disclosure, the frame part 230 may be detachably attached to the body 210, and as shown in FIG. 4, the support bar 235 may be detached from the body 210 to completely separate the body 210 and the display 220. The display 220 coupled to the separated frame part 230 may display input information applied to the body 210 while exchanging wireless communication signals (e.g., Wi-Fi signals) with the body 210.

Furthermore, the flexible printed circuit board 250 mounted with electronic devices may be provided in the board mounting part 234 disposed at one end portion of the rear plate 233 to display a screen on the display 220 by the driver IC.

In addition, as shown in FIG. 4, in a state in which the mobile terminal 200 and the display 220 are separated from each other, the sub mobile terminal 10 may be additionally coupled to one side of the board mounting part 234 to implement an extended function by the sub mobile terminal 10.

As shown in FIG. 5, the frame part 230 may further include the support bar 235 provided at one end portion of the rear plate 233, and extended in one direction to connect the first link part 231 and the second link part 232 disposed to face each other.

The magnets 213, 235a may be provided in the support bar 235 and the body 210, respectively, at positions corresponding to each other, thereby allowing the support bar 235 to be detachably attached to one side of the outer surface of the body 210.

Accordingly, the display 220 may be rolled in the form of a scroll while the support bar 235 is in close contact with the body 210 along the respective link parts 231, 232 in a state in which the support bar 235 is attached to the body 210, and the display 220 may be configured to be unrolled from the body 210 in a rolled state.

Furthermore, since the support bar 235 attached to one side of the body 210 can be released after the display 220 is completely unrolled from the body 210, the body 210 and the display 220 may be separated from each other.

As shown in FIG. 5, a first magnet 213 may be provided on one side of the outer surface of the body 210, and at least one second magnet 235a may be provided on one side of the support bar 235.

The first magnet 213 and the second magnet 235a may form a mutual attractive force such that the support bar 235 can be seated in a support bar seating groove 212 and then fixed thereto.

The support bar seating groove 212 may be disposed on an outer surface of the body 210 to extend in a length direction in a predetermined shape of groove. The support bar seating groove 212 may be recessed in a shape corresponding to an outer surface of the support bar 235 such that the support bar 235 can be seated therein.

Here, at least one first magnet 213 may be provided on one side of the support bar seating groove 212. The first magnet 213 may be configured such that a plurality of permanent magnets having an N pole and an S pole are arranged side by side.

At least one second magnet 235a may be provided at a position corresponding to the first magnet 213 on one side of the support bar 235. The second magnet 235a may be provided on one side of the support bar 235 corresponding to the first magnet 213 when the support bar 235 is seated in the support bar seating groove 212.

The first magnet 213 and the second magnet 235a may be configured to form an attractive force by interaction so that the support bar 235 is attached to the support bar seating groove 212 by a magnetic force.

In other words, the first magnet 213 and the second magnet 235a may provide an external force such that the support bar 235 of the frame part 230 can be closely attached to the support bar seating groove 212 of the body 210, thereby maintaining a state in which the display 220 can be rolled along the outer surface of the body 210.

Figure 7:
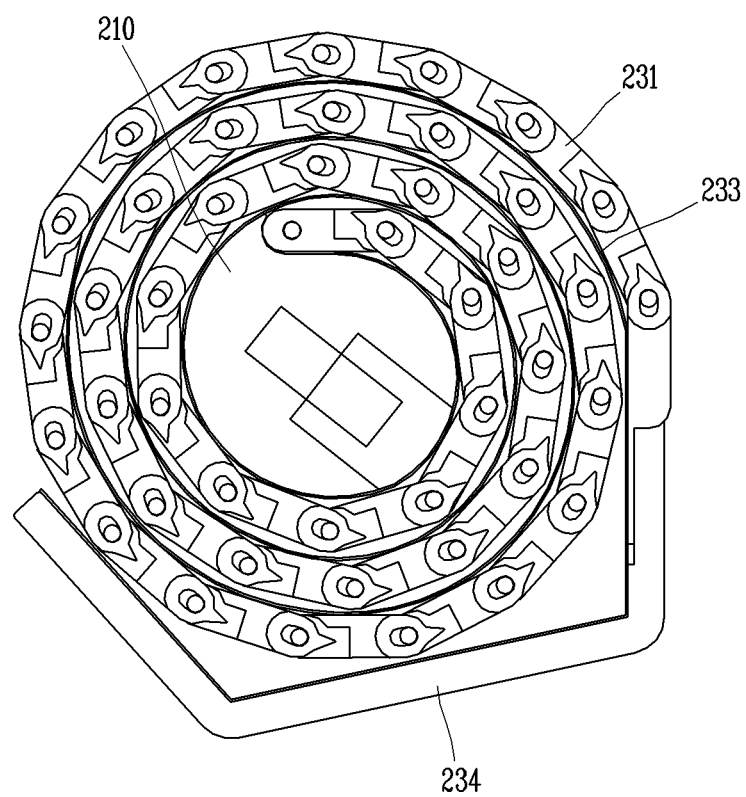
FIG. 7 is a conceptual view showing a shape in which the frame part is rolled around the body.
Figure 8A:
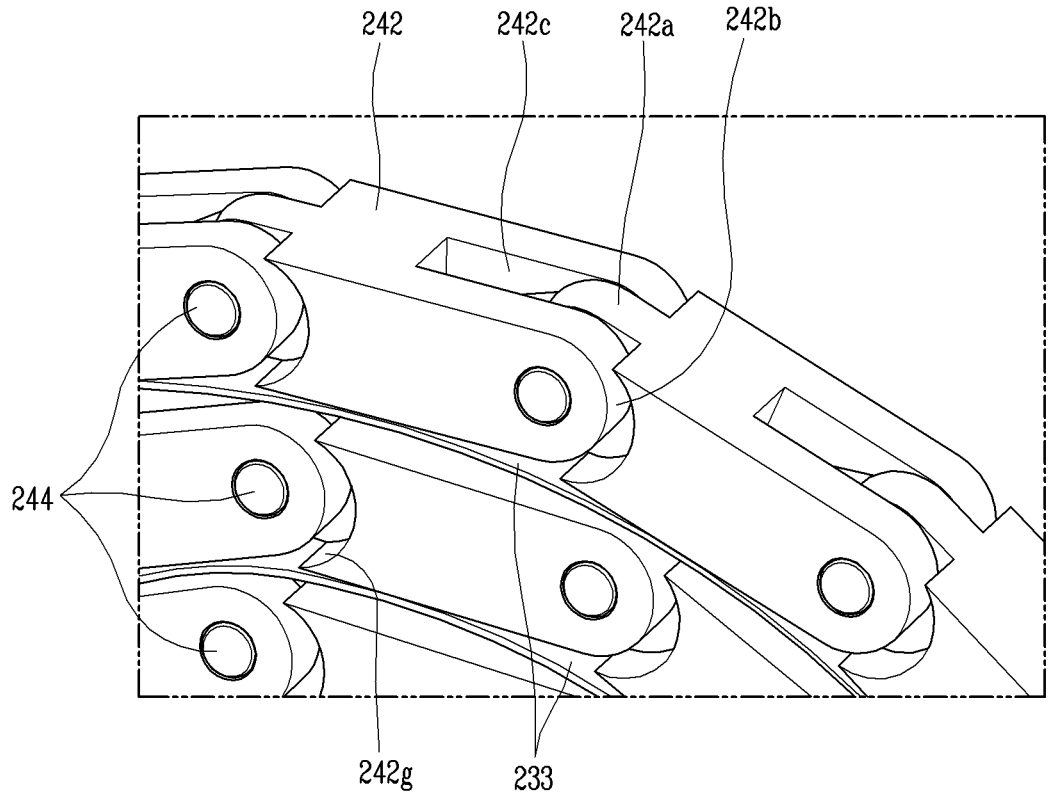
FIG. 8A is an enlarged view showing a shape of a link part when the frame part is rolled around the body.
Figure 8B:
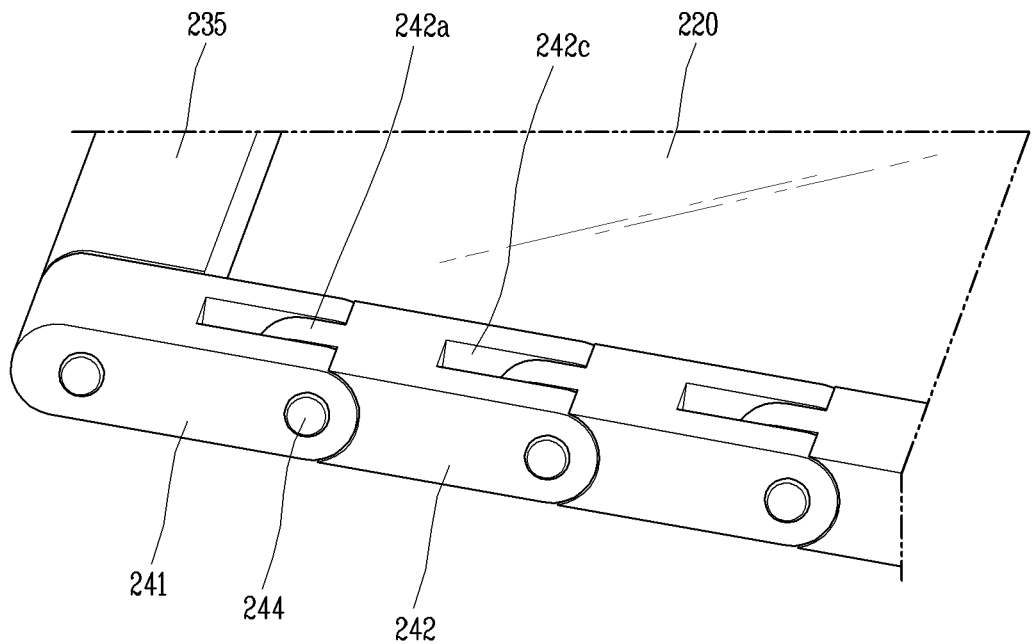
FIG. 8B is an enlarged view showing a shape of the link part in a state in which the frame part is unrolled from the body.

FIG. 7 is a conceptual view showing a shape in which the frame part 230 is rolled around the body 210. FIG. 8A is an enlarged view showing the link parts 231, 232 when the frame part 230 is rolled around the body 210, and FIG. 8B is an enlarged view showing a shape of the link parts 231m 232 in a state in which the frame part 230 is unrolled from the body 210.

As described above, the mobile terminal 200 according to the present disclosure may have a structure in which the display 220 supported by the frame part 230 can be rolled along the body 210 in a shape such as a roll of tissue paper or the display 220 can be unrolled from the body 210.

According to the implementation, the mobile terminal 200 may include the frame part 230 such that the display 220 is rolled around the body 210 while supporting the body 210 and the display 220. The configuration of the body 210 and the frame part 230 is the same as described above with reference to FIGS. 2 to 6B, and a description thereof will be omitted in the duplicate range.

As shown in FIG. 7, the display 220 coupled to the rear plate 233 may be rolled around the body 210 together with the link parts 231, 232 as the link parts 231, 232 are rolled around the body 210. For example, in a state in which the support bar 235 is seated in the support bar seating groove 212 of the body 210, the display 220 may be rolled in a clockwise direction along the link parts 231 and 232.

Furthermore, the link parts 231, 232 may be rolled in a counterclockwise direction along an outer circumferential surface of the body 210.

The board mounting part 234 disposed on one side of the rear plate 233 may be divided into rigid regions and flexible regions, and a bent region in FIG. 7 denotes a flexible region, and a region having a flat shape for a mounting printed circuit board or electronic devices denotes a rigid region.

In addition, when the frame part 230 is in an unrolled state, a third magnet 253 may be provided at a position spaced farthest apart from the body 210. For example, the third magnet 253 may be provided on one side of the board mounting part 234, and the third magnet 253 may form an attractive force to fix one side of the frame part 230 to the body 210 so as to prevent the frame part 230 from being released from the body 210 while the frame part 230 is rolled around the body 210.

By each link part, the rear plate may be bent along the outer surface of the body 210, and the display 220 may be rolled along the outer surface of the body 210.

The link parts 231, 232 may include a first link part 231 and a second link part 232 disposed to face each other on both sides of the display 220. The first link part 231 and the second link part 232 are configured to be simultaneously rolled along the outer surface of the body 210 on the rear plate 233 so as to obtain a more stable movement when the display 220 is rolled or unrolled.

Each of the link parts 231, 232 is provided on both sides of the rear plate 233, respectively, and may include a plurality of link members 241, 242, 243 arranged one another side by side. Each of the link members 241, 242, 243 may be rolled along the outer surface of the body 210 while being connected to one another.

Each of the link members 241, 242, 243 disposed adjacent to one another may be configured to rotate by a predetermined angle with respect to a connection pin 244 while being connected to one another, and the display 220 may be rolled or unrolled along the outer surface of the body 210 together with the rear plate 233 as each of the link members 241, 242, 243 is rotated.

FIG. 8A is an enlarged view showing the link parts 231 and 232 when the frame part 230 is rolled around the body 210, and FIG. 8B is an enlarged view showing a shape of the link parts 231 and 232 in a state in which the frame part 230 is unrolled from the body 210.

The link members 241, 242, 243 may include a first link member 241, a second link member 242, and a third link member 243. The first link member 241 and the third link member 243 may be respectively positioned at both ends of the second link member 242, and may be connected to the second link member 242.

Here, as shown in FIG. 8A, each of the link members 241, 242, 243 connected to one another may be configured to be mutually rotatable so as to be rolled along the outer surface of the body 210, and the display 220 may be smoothly rolled around the body 210.

The first link member 241 is positioned at one end of the link parts 231, 232, and may be connected to the support bar 235.

The first link member 241 may be fixed to one end portion of the support bar through a connection pin, and the first link member may rotate with respect to the connection pin 244.

The second link member 242 may be connected to one side of the first link member 241. A plurality of second link members 242 having the same shape may be connected to one another while being arranged side by side.

Figure 9:
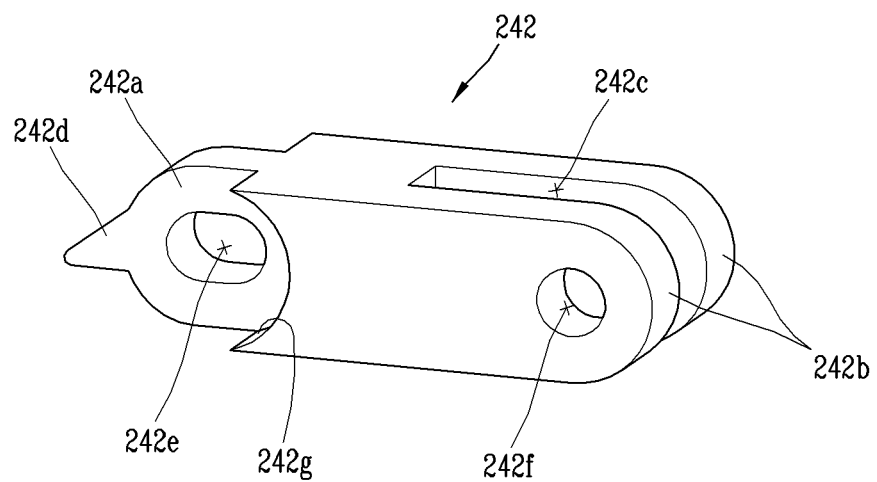
FIG. 9 is a perspective view showing a shape of a second link member.

FIG. 9 is a perspective view showing a shape of the second link member 242.

When the frame part 230 is rolled around the body 210, the second link members 242 connected to one another may rotate in one direction such that each of the second link members 242 can be rolled along the body 210.

A connection protrusion 242a protrudes from a front end portion of the second link member 242, and a guide protrusion 242b protrudes from a rear end portion thereof.

A connection groove 242c having a recessed shape may be disposed in the guide protrusion 242b.

The connection protrusion 242a may be inserted into the connection groove 242c of the second link member 242 disposed adjacent thereto and then coupled through the connection pin 244 to rotate with respect to each other.

Specifically, a first fastening hole 242e having an oval shape may be disposed in the connection protrusion 242a, and a second fastening hole 242f having a circular shape may be disposed in the guide protrusion 242b.

The connection pins 244 may be inserted into the first fastening hole 242e and the second fastening hole 242f, respectively.

In other words, the second link member 242 can be rolled along the outer surface of the body 210 through a structure in which the connection pin 244 is inserted to pass through the first fastening hole 242e of any second link member 242 and the second fastening hole 242f of another second link member 242, which are disposed adjacent to each other.

Figure 10A:
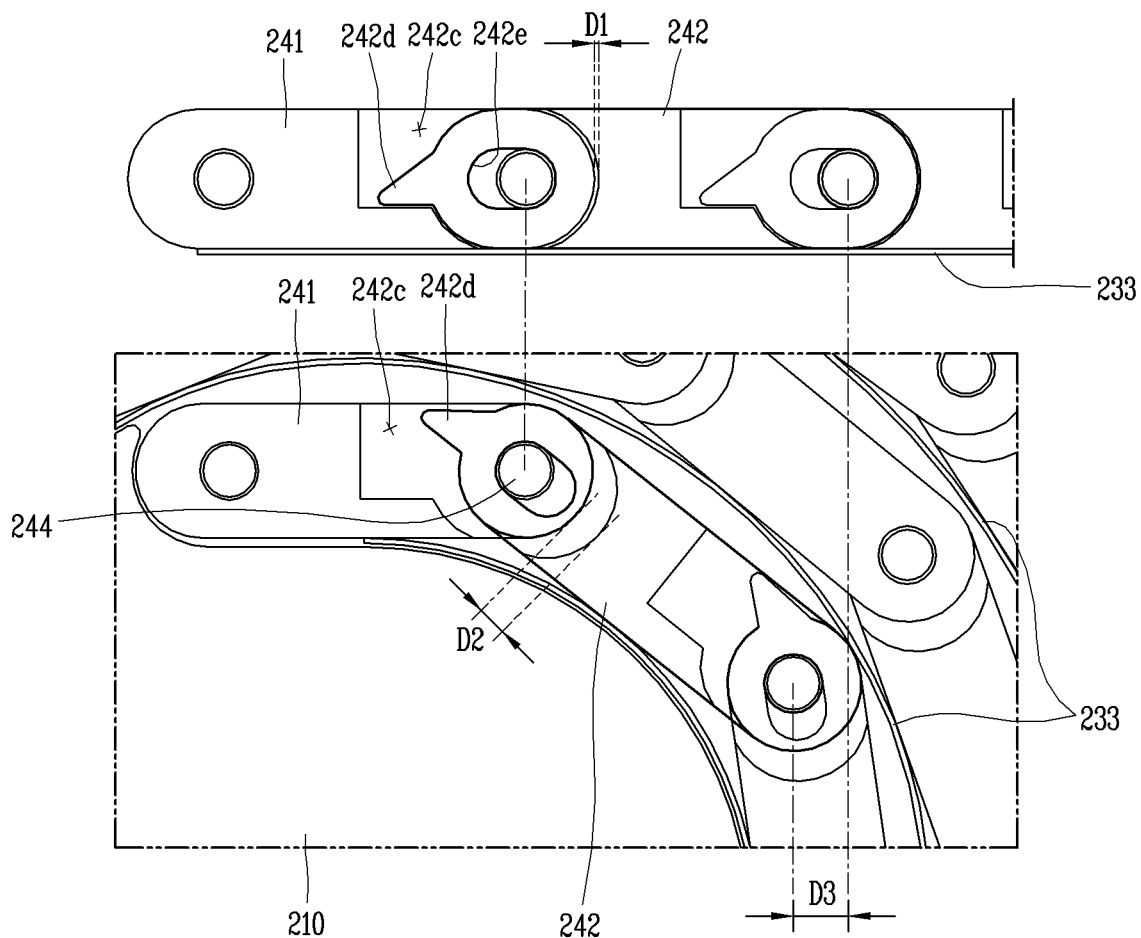
FIG. 10A is a conceptual view showing a shape when each link member is deformed to be rolled around the body.
Figure 10B:
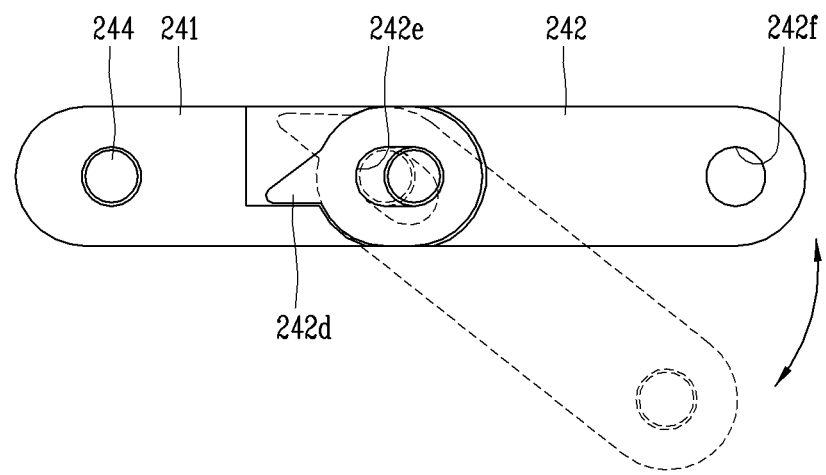
FIG. 10B is a conceptual view showing that the second link member can be rotated in only one direction through a rotation limiter disposed in the second link member.

FIG. 10A is a conceptual view showing a shape when each link member 241, 242, 243 is deformed to be rolled around the body 210, and FIG. 10B is a conceptual view showing that the second link member 242 can be rotated in only one direction through a rotation limiter 242d disposed in the second link member 242.

The rotation limiter 242d may be provided on one side of the connection protrusion 242a of the second link member 242. The connection protrusion 242a may be positioned to be inserted into the connection groove 242c of the second link member 242 disposed adjacent thereto, and the rotation limiter 242d protruded from an end portion of the connection protrusion 242a may be caught on one side of the connection groove 242c of the adjacent second link member 242, thereby limiting further movement of the second link member.

As shown in FIG. 10B, when the link parts 231, 232 are unrolled from a state of being rolled around the body 210, the second link member 242 may be rotated counterclockwise, but can be prevented from being rotated beyond a completely unrolled state, and pushed over in a direction opposite to the rolling direction through the rotation limiter 242d. In other words, after the link part is unrolled from the body, deformation in a direction different from a direction in which the link part is rolled may be limited, thereby securing the users convenience.

Deformation of each link member 241, 242, 243 to be rolled around the body 210 will be described with reference to FIG. 10A.

The rear plate 233 may be rolled along the outer surface of the body 210 while the link members support the rear plate 233.

The link members may be provided so as to be mutually rotatable between adjacent members connected to one another.

In this case, a rolling state of the display 220 may be defined as a separation distance between each member is reduced.

And an unrolled state of the display 220 may be defined as a separation distance between the adjacent link members is increased.

As described above, the connection protrusion 242a may be positioned to be inserted into the connection groove of the second link member disposed adjacent thereto, and coupled through the connection pin 244 to rotate with respect to each other.

Here, since the first fastening hole 242e having an oval shape is disposed in the connection protrusion 242a, and the second fastening hole 242f having a circular shape is disposed in the guide protrusion, when the connection pin 244 is provided to pass through the first fastening hole 242e and the second fastening hole 242f, the connection pin 244 positioned inside the first fastening hole 242e is movable in both directions.

The second link member can be rolled along the outer surface of the body 210 through a structure in which the connection pin 244 is inserted to pass through the first fastening hole 242e of any second link member and the second fastening hole 242f of another second link member, which are disposed adjacent to each other.

As shown in FIG. 10A, when the link part is rolled along the body 210 in an unrolled state, the position of the connection pin 244 may change to deform the link part to have a predetermined curvature.

When the display 220 is rolled along the body 210 in a completely unrolled state, the connection pin 244 may move to a left side of the first fastening hole 242e to correspond to a length according to the bending of the display 220, and on the contrary, when the display 220 is unrolled from a rolled state, the connection pin 244 may move to a right side of the first fastening hole 242e. Through this, smooth deformation of the display 220 may be allowed.

In other words, when the frame part 230 is rolled along the outer surface of the body 210, the position of the connection pin 244 inserted into the first fastening hole 242e may be changed by the deformation of the display 220 rolled along the frame part 230, and the connection pin 244 may be inserted into the second fastening hole 242f of the adjacent second link member to rotate the adjacent second link member. Accordingly, as the display 220 is rolled, the generation of stress that may occur between the link part and the rear plate 233 or the display 220 may be prevented, thereby preventing the display 220 from being damaged or the link part from being broken by an external force.

Furthermore, referring to a distance D1 between the adjacent second link members in an unrolled state of the display 220 can be rolled while reducing a separation distance D2 between the second link members as the link part is rolled along the body 210.

Figure 11:
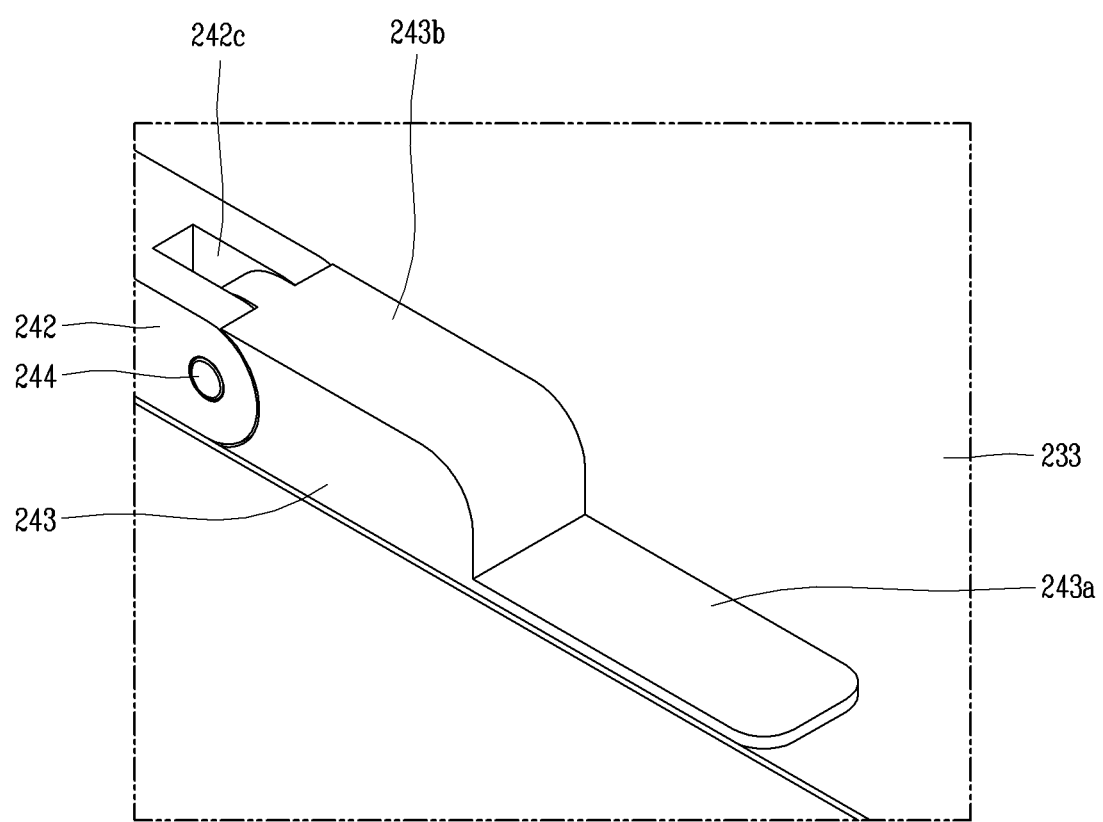
FIG. 11 is a perspective view showing a shape of a third link member.

FIG. 11 is a perspective view showing a shape of the third link member 243, wherein the third link member 243 is positioned at the other end portion of the link part, and one side thereof is configured to be connected to the second link member. The third link member 243 may have a plate coupling portion 243a protruding from one end of a body 243b. The plate coupling portion may be coupled to the rear plate 233 through various methods such as bonding, welding, brazing coupling, and the like.

Figure 12A:
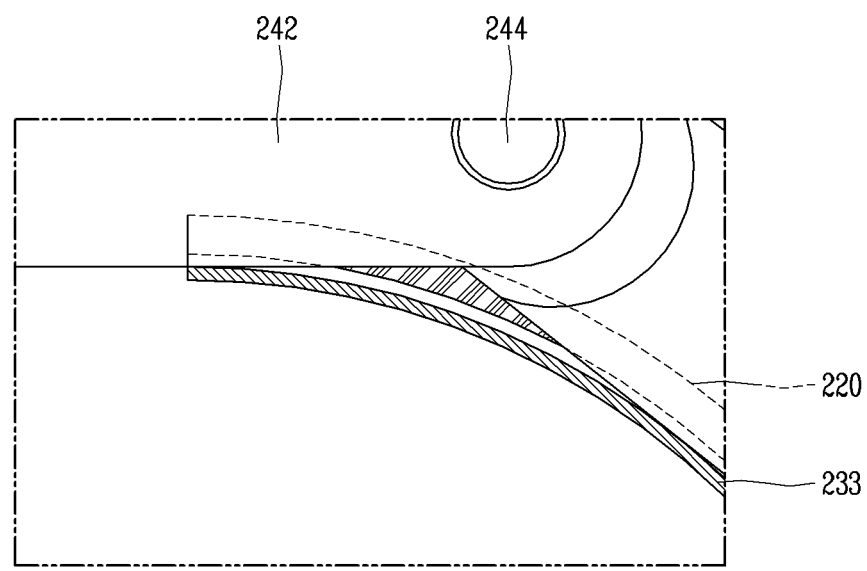
FIG. 12A is a conceptual view showing a shape in which a front surface portion of the display is exposed to the outside when the display is rolled around the body.
Figure 12B:
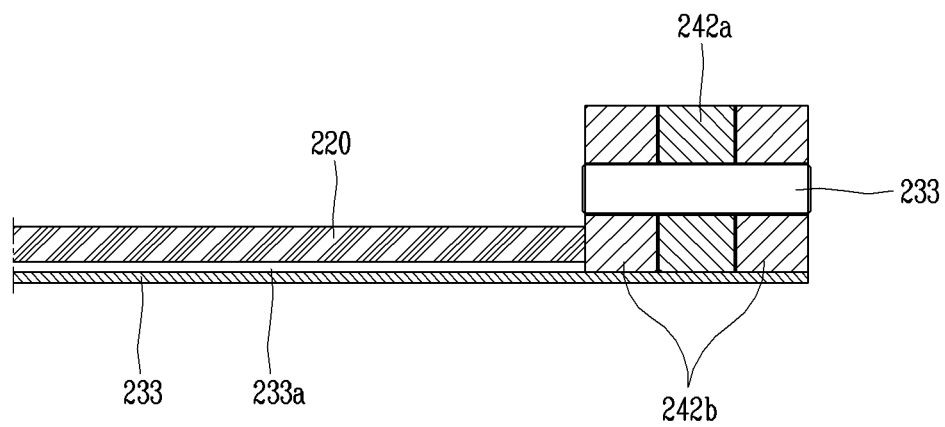
FIG. 12B is a cross-sectional view of FIG. 12A.

FIG. 12A is a conceptual view showing a shape in which a front surface portion of the display 220 is exposed to the outside when the display 220 is rolled around the body 210, and FIG. 12B is a cross-sectional view of FIG. 12A.

The user may use the display 220 of the mobile terminal in an unrolled state, and apply an external force to the display 220 to roll the display 220 around the body 210 for storage after the use is completed.

To this end, the link member may be coupled to a rear surface portion (bottom surface portion) of the display 220 to serve to support the display 220.

Here, the display 220 and the link part may be provided on the same surface of the rear plate 233, and the link parts may be provided at both upper and lower sides of the display 220 along the unrolling direction of the display 220 to be spaced apart from the display 220 by a predetermined distance.

In this case, when the display 220 is rolled around the body 210, a front surface portion of the display 220 may be exposed to the outside. The display 220 may be rolled to be exposed to the outside.

In other words, when the display 220 is coupled to one surface of the rear plate 233, and the display 220 is rolled around the body 210, the rear plate 233 may be positioned to be adjacent to the body 210, thereby having a structure in which the display 220 attached to the other surface of the rear plate 233 is exposed to the outside.

Figure 13A:
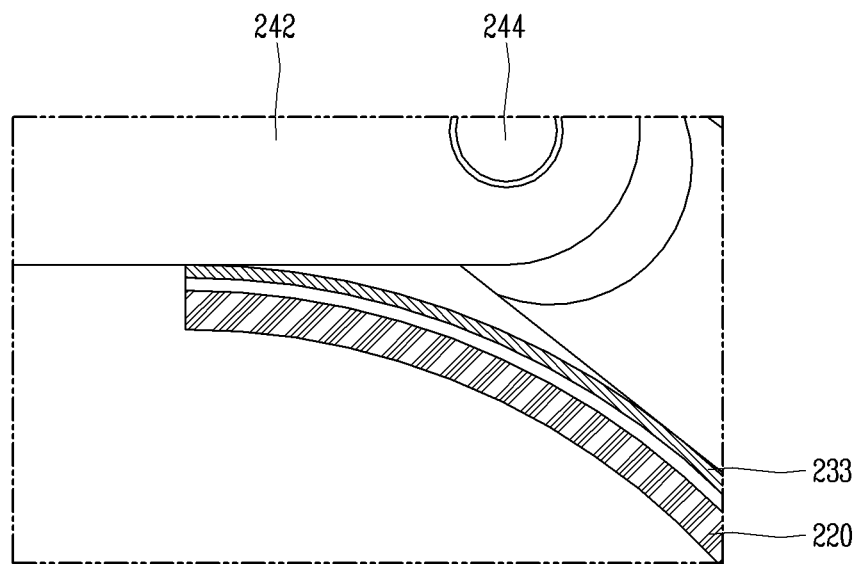
FIG. 13A is a conceptual view showing a shape in which a rear plate is exposed to the outside when the display is rolled around the body.
Figure 13B:
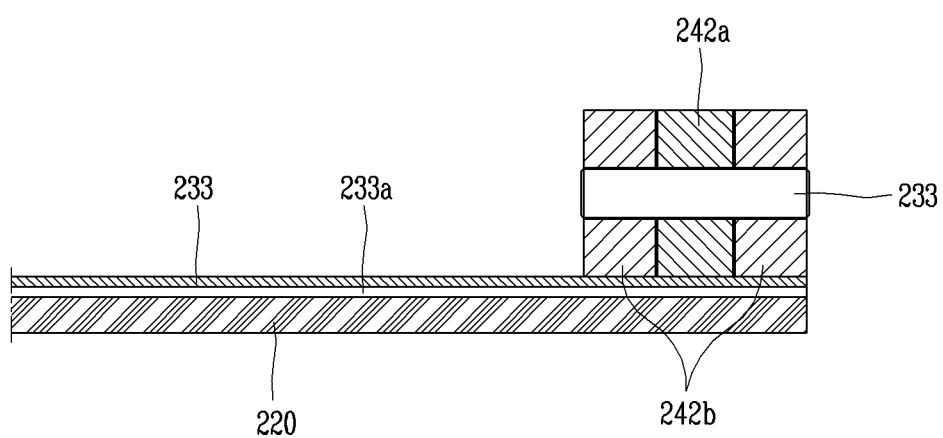
FIG. 13B is a cross-sectional view of FIG. 13A.

FIG. 13A is a conceptual view showing a shape in which the rear plate 233 is exposed to the outside when the display 220 is rolled around the body 210, and FIG. 13B is a cross-sectional view of FIG. 13A.

The user may use the display 220 of the mobile terminal in an unrolled state, and apply an external force to the display 220 to roll the display 220 around the body 210 for storage after the use is completed.

To this end, the link member may be coupled to a rear surface portion (bottom surface portion) of the display 220 to serve to support the display 220.

When an external force is applied to the display 220 while the display 220 is unrolled, the display 220 may be rolled around the body 210 while being deformed.

At this time, the display 220 and the link part may be respectively provided on different surfaces of the rear plate 233, and when the display 220 is rolled around the body 210, the rear plate 233 may be exposed to the outside.

In other words, when the display 220 is coupled to one surface of the rear plate 233, and the display 220 is rolled around the body 210, the display 220 may be positioned to be adjacent to the body 210, and the rear portion of the display 220 may be coupled to the rear plate 233, thereby having a structure in which the rear plate 233 is exposed to the outside. In this case, unlike the structure in which the front surface portion of the display 220 is exposed to the outside, a structure in which the link parts together with the rear plate 233 are is exposed to the outside will be provided.

Figure 14A:
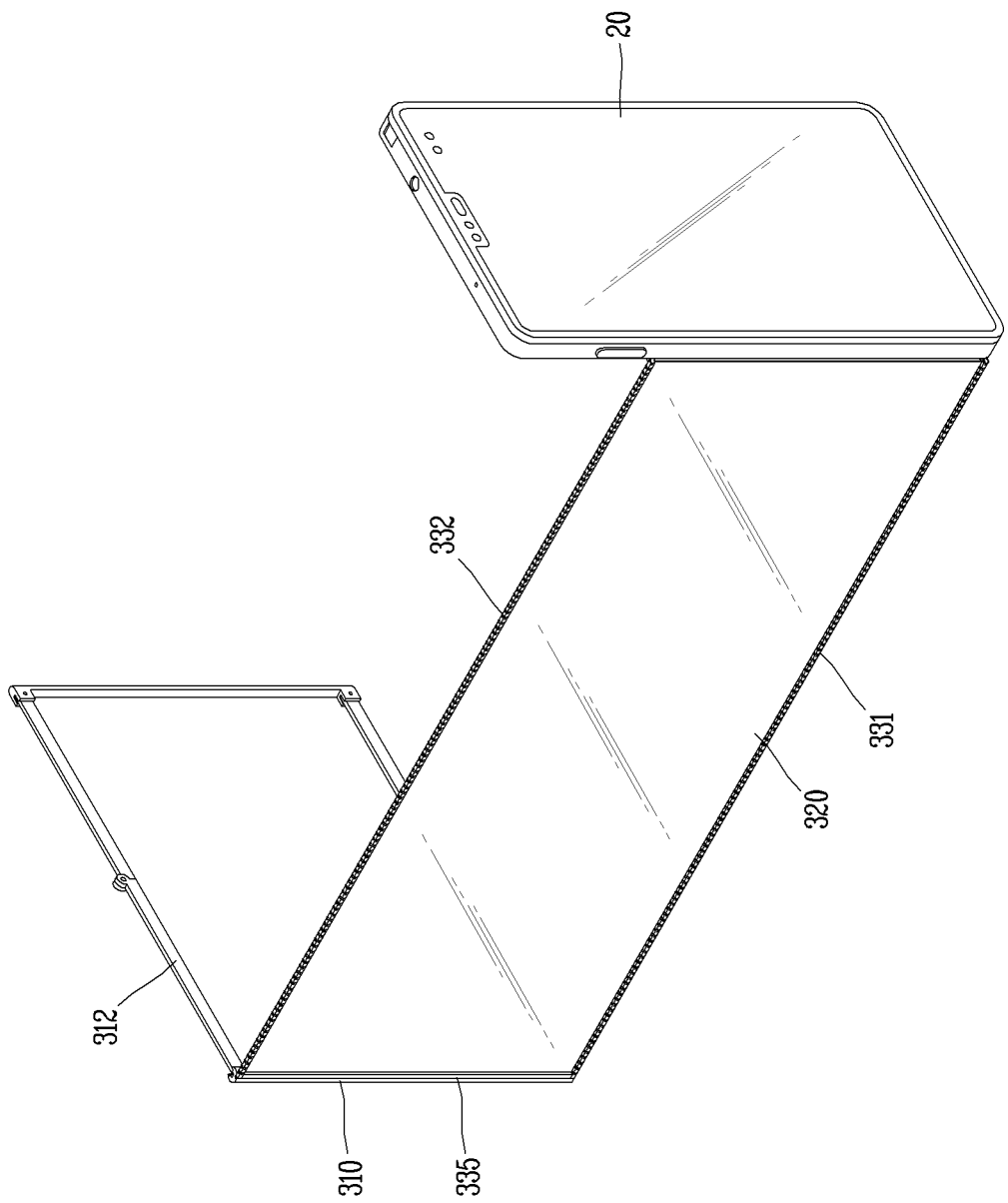
FIG. 14A is a perspective view showing a shape of a mobile terminal according to an implementation of the present disclosure.
Figure 14B:
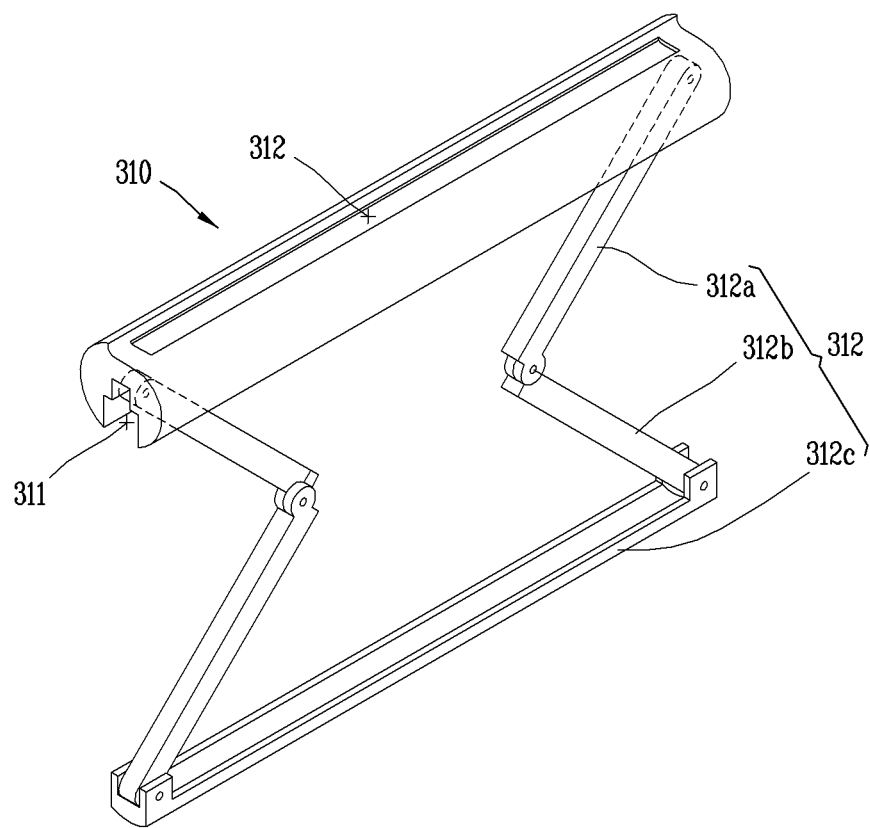
FIG. 14B is a perspective view showing a shape in which a mounting member is unrolled from the body.
Figure 14C:
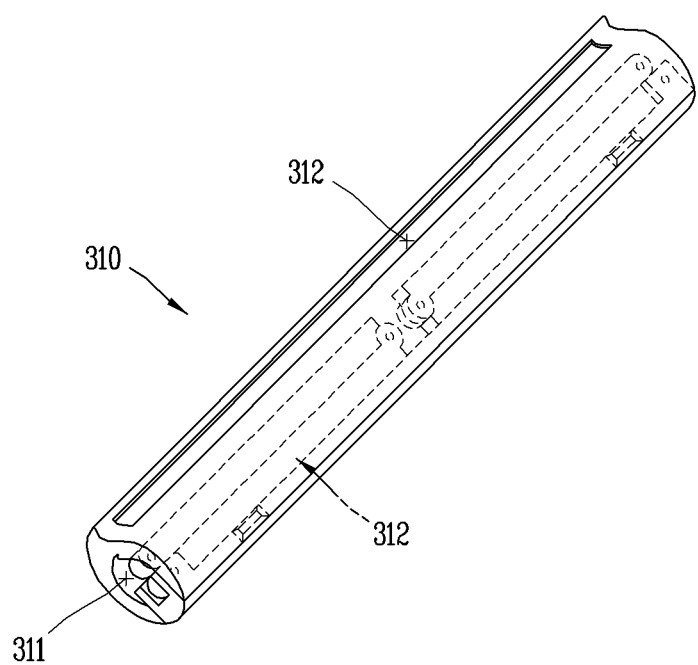
FIG. 14C is a conceptual view showing a shape in which the mounting member is mounted into the body.

FIG. 14A is a perspective view showing a shape of a mobile terminal according to an implementation of the present disclosure, FIG. 14B is a perspective view showing a shape in which a mounting member 312 is unfolded from the body 310, and FIG. 14C is a conceptual view showing a shape in which the mounting member 312 is mounted into the body 310.

A mounting groove 311 defining a predetermined space may be disposed inside the body 310, and the mounting member 312 may be mounted into the mounting groove 311 as a means for securing user's convenience of use.

The mounting member 312 serves to support the mobile terminal, and allows the display to be mounted on the ground in a horizontal or vertical direction.

For example, as shown in FIG. 14A, the body 310 connected to one side of the display 320 and a sub mobile terminal 20 installed at the other end thereof can be mounted on the ground using the unfolded mounting member 312.

The mounting member 312 may include a first member 312a one side of which is fixed to the body 310 and a second member 312b one side of which is connected to the first member 312a to rotate. Each of the first member and the second member may be configured in plurality, and as shown in FIG. 14B, the first member 312a may be composed of two bars, which are spaced apart from each other by a predetermined distance, and one ends of which are respectively fixed to the mounting groove 311 of the body 310. Similarly, the second member 312b may be composed of two bars, which are respectively connected to those of the first member 312a. Furthermore, the mounting member 312 may include a third member 312c connecting those of the second member 312b.

When the mounting member 312 is taken or pulled out from the mounting groove 311, the first member 312a and the second member 312b are rotated away from each other. Conversely, when the mounting member 312 is inserted toward the mounting groove 311, the first member 312a and the second member 312b are rotated in a direction close to each other, and finally mounted to each other side by side in the mounting groove 311.

Figure 15A:
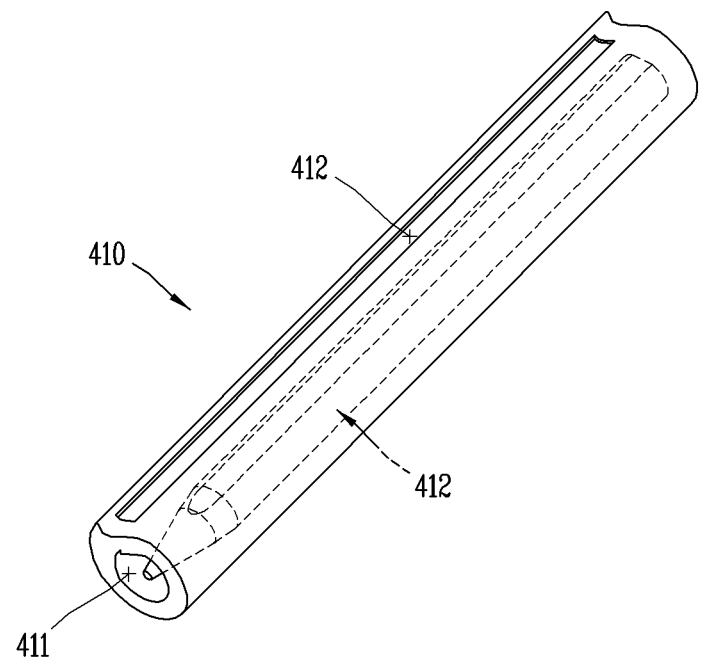
FIG. 15A is a conceptual view showing a shape in which a stylus is mounted into the body.
Figure 15B:
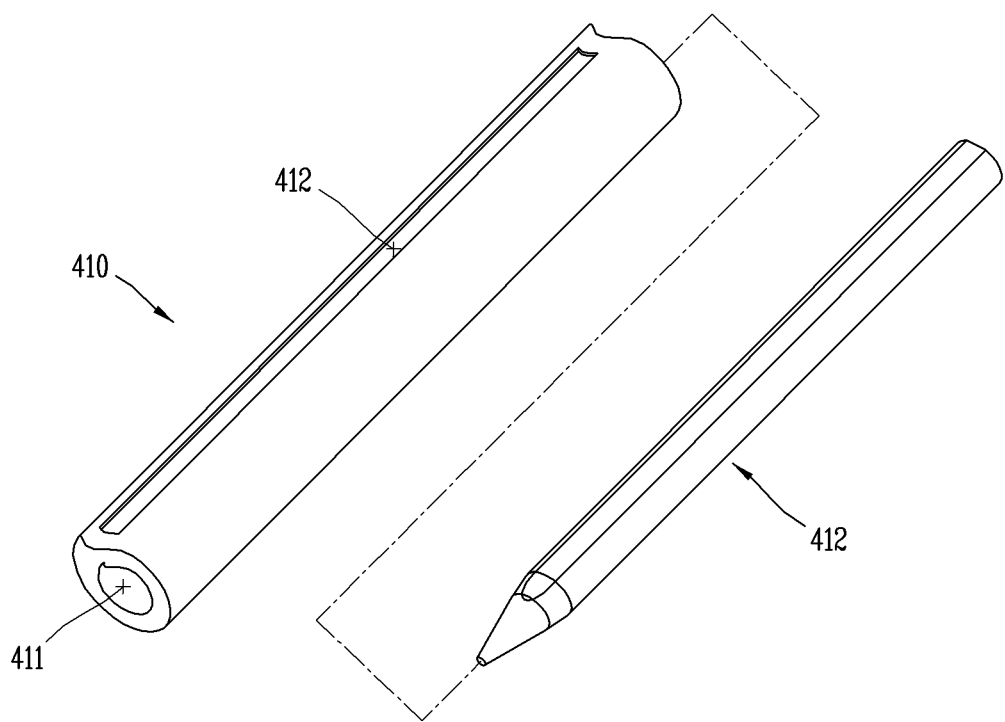
FIG. 15B is a conceptual view showing a shape in which the stylus is released from the body.

FIG. 15A is a conceptual view showing a shape in which a stylus 412 is mounted into the body 410, and FIG. 15B is a conceptual view showing a shape in which the stylus 412 is released from the body 410.

A mounting groove 411 defining a predetermined space may be disposed inside the body 410, and the stylus 412 may be mounted in the mounting groove 411. The stylus 412 may be provided in a manner of being inserted into or drawn out from the mounting groove 411 from one side of the body 410. Here, the stylus 412 is defined in the shape of a pen, and denotes an element capable of inputting a touch input signal to the display 220 using a front end portion thereof. The stylus 412 is also referred to as a smart pen.

Accordingly, the user may completely release the stylus 412 mounted into the body 410, and then utilize the stylus 412 to form a signal by a touch or input information to the display 220 using a pointed end portion of the stylus 412.

Figure 16:
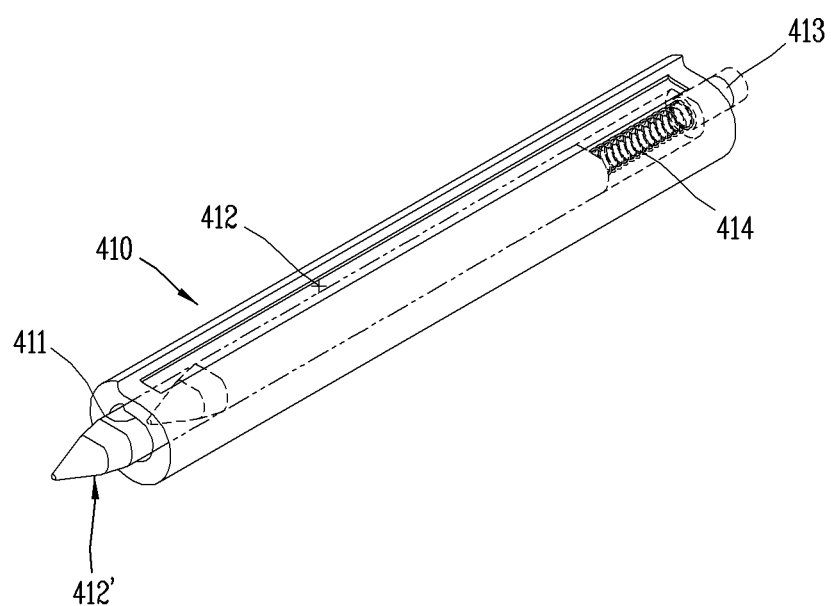
FIG. 16 is a conceptual view showing a shape in which one end of the stylus mounted into the body protrudes to the outside according to another implementation of the present disclosure.

FIG. 16 is a conceptual view showing a shape in which one end of the stylus 412' mounted into the body 410 protrudes to the outside according to another implementation of the present disclosure.

The stylus 421' may be mounted in a space defined inside the body 410. One end of the stylus 412' may protrude to the outside through the mounting hole 411 disposed at one end portion of the body 412'.

At this time, the insertion and withdrawal (or removal) of the stylus 412' may be made through an elastic member 414 provided inside the body 410. When the user presses a button part 413 disposed at an outside of the body 410 to use the stylus 412', the stylus 412' may receive an elastic force by the elastic member 414 to allow the front end portion of the stylus 412' to protrude outward.

A protruding end of the stylus 412' may be used to produce a signal or input information by a touch on the display 220. Accordingly, the user may grip the body 410, and then input a signal to the display 220 using one end of the stylus 412' protruding from the mounting hole 411 of the body 410.

Figure 17:
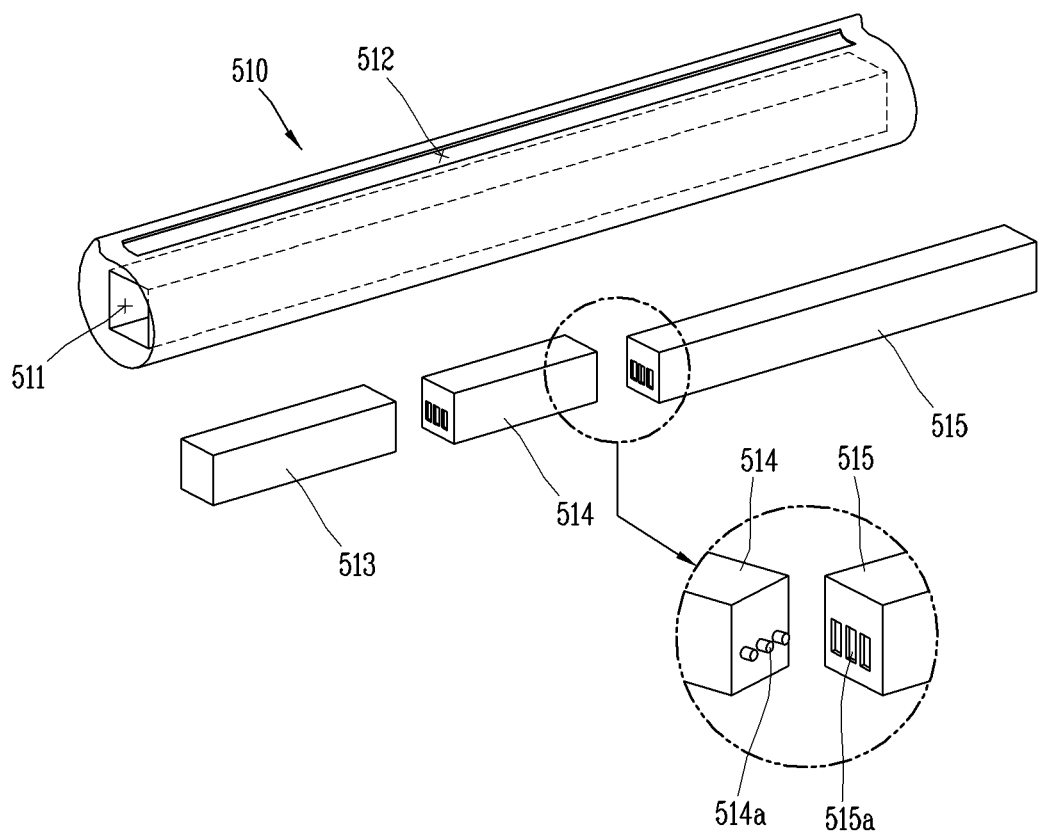
FIG. 17 is a conceptual view showing a shape in which various electronic components are provided in the body.

FIG. 17 is a conceptual view showing a shape in which various electronic components are provided in a body 510.

A communication module 512 for wireless communication and an AP module 513 for data processing may be provided in an inner space of the body 510. Furthermore, a power supply unit 514 for supplying power to the display 220 rolled around or attached to the body 510, and for supplying power to the communication module 512 and the AP module 513 provided inside the body may be provided inside the body 510. The power supply unit 514 may supply power to the AP module or the communication module in such a manner that contact pins 513a are in contact with connection terminals 514a.

Here, the power supply unit 514 may denote a battery 514 configured to be attached to or detached from the body 510. The battery 514 may be configured to receive power through a power cable connected to the interface unit 160, and may be configured to be wirelessly charged through a wireless charging device. Here, the wireless charging may be implemented by magnetic induction or electromagnetic resonance.

The foregoing detailed description should not be construed as restrictive but considered as illustrative in all aspects. The scope of the disclosure should be determined by reasonable interpretation of the appended claims and all changes that come within the equivalent scope of the disclosure are included in the scope of the disclosure.

The present disclosure may be implemented in various ways in order to produce or use a mobile terminal having a flexible display.

What is claimed is:

1. A mobile terminal, comprising:
   a body;
   a display configured to be deformed along an outer surface of the body by an external force; and
   a frame part that supports the display and is deformed to a shape surrounding the outer surface of the body,
   wherein the frame part comprises:
   a rear plate that is coupled to one surface of the display and is deformable so as to correspond to the outer surface of the body together with the display; and
   link parts provided on both sides of the rear plate, respectively, and provided with a plurality of link members arranged side by side, a first link part and a second link part spaced apart from the display by a predetermined distance along a direction in which the display is unrolled and respectively disposed at upper and lower portions of the display to face each other, and wherein,
   the link parts allow the display to be rolled or unrolled along the outer surface of the body together with the rear plate by rotation between the link members connected to one another, the display and the link part are provided on a same surface of the rear plate, the display is rolled around the body to allow a front surface portion thereof to face an outside, and the first link part and the second link part are rolled together in a same direction along the outer surface of the body along the rear plate.

2. The mobile terminal of claim 1, wherein the link parts define an rolled state of the display while being in close contact with the outer surface of the body, and define an unrolled state of the display while being spaced apart from the outer surface of the body.

3. The mobile terminal of claim 1, wherein the display and the link part are provided on different surfaces of the rear plate, and
   wherein the rear plate is exposed to the outside when the display is rolled around the body.

4. The mobile terminal of claim 1, wherein a board mounting part is coupled to an end portion of the rear plate, and wherein a flexible printed circuit board (FPCB) on which electronic devices are mounted is provided in the board mounting part.

5. The mobile terminal of claim 4, wherein a battery is provided in the board mounting part.

6. The mobile terminal of claim 4, wherein a sub mobile terminal is coupled to the board mounting part to allow independent driving of the display.

7. The mobile terminal of claim 1, wherein the frame part further comprises a support bar provided at an end portion of the rear plate to connect the link parts disposed to face each other, and
wherein the support bar is coupled to one side of the outer surface of the body.

8. The mobile terminal of claim 7, wherein a support bar seating groove is formed on the outer surface of the body to have a predetermined shape in a length direction, and is recessed in a shape corresponding to an outer surface of the support bar to allow the support bar to be seated therein.

9. The mobile terminal of claim 8, wherein at least one first magnet is provided at one side of the support bar seating groove,
wherein at least one second magnet is provided at a position corresponding to the first magnet, and
wherein the first magnet and the second magnet form an attractive force by interaction to allow the support bar to be seated in the support bar seating groove.

10. The mobile terminal of claim 9, wherein the first magnet is provided on one side of the outer surface of the body,
wherein a third magnet is provided on one side of the rear plate spaced farthest apart from the body when the frame part is in an unrolled state, and
wherein the third magnet provides an external force to allow the body to be in close contact with each other when the frame part is wound around the body.

11. The mobile terminal of claim 7, wherein the link member comprises:
a first link member positioned at one end portion thereof and fixed to both ends of the support bar through a connection pin;
a second link member connected to the first link member, the second link member provided in plurality of the same shape to be arranged side by side; and
a third link member positioned at another end portion thereof and connected to the second link member.

12. The mobile terminal of claim 11, wherein a connection protrusion protrudes from a front end portion of the second link member, and a guide protrusion protrudes from a rear end portion of the second link member,
wherein a connection groove is recessed into the guide protrusion, and
wherein the connection protrusion is inserted into the connection groove of the adjacent second link member to be coupled through the connection pin, so as to rotate with respect to each other.

13. The mobile terminal of claim 12, wherein a first fastening hole having an oval shape is formed in the connection protrusion,
wherein a second fastening hole having a circular shape is formed in the guide protrusion, and
wherein the connection pin is inserted to pass through the first fastening hole of one of the plurality of second link members, and the second fastening hole of another one of the plurality of second link members, which are disposed adjacent to each other.

14. The mobile terminal of claim 13, wherein a rotation limiter protrudes from the second link member to limit rotation beyond a set rotation angle.

15. The mobile terminal of claim 1, wherein a mounting groove defined by a fixed space along an extension direction of the body is formed on a central portion of the body.

16. The mobile terminal of claim 15, wherein a battery is provided in the mounting groove to supply power to the mobile terminal.

17. The mobile terminal of claim 15, wherein a mounting member for supporting the mobile terminal is mounted to the mounting groove, and is configured to be pulled out by a user.

18. The mobile terminal of claim 15, wherein a stylus for inputting a signal to the display is inserted into or drawn out from the mounting groove.

19. The mobile terminal of claim 18, wherein the stylus receives an elastic force from an elastic member that is provided inside the body, so as to allow at least a portion thereof to be drawn out from the mounting groove.

20. The mobile terminal of claim 1, wherein the link members are configured to be mutually rotatable between members adjacent to one another so as to define a rolled state of the display as a separation distance between the link members adjacent to one another decreases, and define an unrolled state of the display as the separation distance between the link members adjacent to one another increases.

* * * * *